(12) United States Patent
Hayasaka et al.

(10) Patent No.: US 8,401,138 B2
(45) Date of Patent: Mar. 19, 2013

(54) SERIAL DATA RECEIVER CIRCUIT APPARATUS AND SERIAL DATA RECEIVING METHOD

(75) Inventors: Kazumi Hayasaka, Kawasaki (JP); Ryuji Iwatsuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 141 days.

(21) Appl. No.: 13/015,243

(22) Filed: Jan. 27, 2011

(65) Prior Publication Data

US 2011/0194651 A1    Aug. 11, 2011

(30) Foreign Application Priority Data

Feb. 8, 2010    (JP) .................................. 2010-25880

(51) Int. Cl.
    *H04L 7/00*          (2006.01)
    *G06F 1/04*          (2006.01)

(52) U.S. Cl. ........................ 375/355; 713/503
(58) Field of Classification Search ................ 375/363; 713/503
See application file for complete search history.

(56) References Cited

U.S. PATENT DOCUMENTS

| | | | |
|---|---|---|---|
| 5,081,654 A * | 1/1992 | Stephenson et al. | 375/368 |
| 5,592,518 A * | 1/1997 | Davis et al. | 375/368 |
| 5,796,795 A * | 8/1998 | Mussman et al. | 375/372 |
| 6,222,380 B1 * | 4/2001 | Gerowitz et al. | 326/38 |
| 6,393,082 B1 | 5/2002 | Nakamura | |
| 6,459,393 B1 * | 10/2002 | Nordman | 341/100 |
| 6,741,615 B1 * | 5/2004 | Patwardhan et al. | 370/514 |
| 6,804,316 B1 * | 10/2004 | Shectman | 375/368 |
| 6,999,543 B1 * | 2/2006 | Trinh et al. | 375/355 |
| 7,151,783 B2 * | 12/2006 | Nakamura et al. | 370/513 |
| 7,315,539 B2 * | 1/2008 | Sund et al. | 370/354 |
| 7,684,442 B2 * | 3/2010 | Annadurai et al. | 370/503 |
| 7,814,376 B2 * | 10/2010 | Bhardwaj | 714/707 |
| 7,840,727 B2 * | 11/2010 | Saeki et al. | 710/71 |
| 2003/0093607 A1 * | 5/2003 | Main et al. | 710/306 |
| 2004/0057539 A1 * | 3/2004 | Boles et al. | 375/354 |

(Continued)

FOREIGN PATENT DOCUMENTS

| | | |
|---|---|---|
| EP | 0249935 A2 | 12/1987 |
| EP | 0397142 A1 | 11/1990 |
| JP | 3094973 B | 10/2000 |
| JP | 2009-94891 A | 4/2009 |

OTHER PUBLICATIONS

European Search Report mailed Dec. 22, 2011 for corresponding European Application No. EP 11 15 3586.

(Continued)

*Primary Examiner* — David C. Payne
*Assistant Examiner* — Michelle M Koeth
(74) *Attorney, Agent, or Firm* — Fujitsu Patent Center

(57) ABSTRACT

A serial data receiver circuit apparatus to receive serial data delimited by a first bit length, the circuit apparatus includes: a serial/parallel converter circuit to convert the serial data into parallel data of a second bit length that is smaller than the first bit length; a data hold circuit to hold a plurality of parallel data; a detector circuit to detect a delimiter position in the received serial data; a detected position hold circuit to generate a select signal to select data included in the parallel data stored in the data hold circuit; and a selector circuit to select data in units of the second bit length starting from the data delimiter position based on the select signal.

8 Claims, 15 Drawing Sheets

U.S. PATENT DOCUMENTS

2009/0096644 A1   4/2009  Fukuhisa
2009/0323878 A1  12/2009  Konishi et al.
2010/0208581 A1*  8/2010  Nagano et al. ................ 370/217
2011/0228861 A1*  9/2011  Nagano et al. ................ 375/259

OTHER PUBLICATIONS

Partial European Search Report dated Jun. 24, 2011 for corresponding European Application No. 11153586.0.

* cited by examiner

SERIAL DATA RECEIVER CIRCUIT APPARATUS AND SERIAL DATA RECEIVING METHOD

CROSS-REFERENCE TO RELATED APPLICATION(S)

This application is based upon and claims the benefit of priority of the prior Japanese Patent Application No. 2010-25880, filed on Feb. 8, 2010, the entire contents of which are incorporated herein by reference.

FIELD

The embodiments discussed herein are related to a circuit apparatus and method for receiving serial data.

BACKGROUND

FIG. 1 illustrates an exemplary application of a serial bus of the related art. The exemplary configuration of the computer system illustrated in FIG. 1 includes: a central processing unit (CPU) 10; a memory control unit (MCU) 11; memory 12; IO adapters 14 to 16 for communicating data with various peripheral control apparatus such as read-only memory (ROM) 17 and a local area network (LAN) 18; and an IO unit (IOU) 13 for controlling the IO adapters 14 to 16.

Data transmission among computers and among computer components has been conducted in the related art by means of transmission using a serial bus and transmission using a parallel bus. Since higher pin counts entail higher costs in semiconductor integrated circuits, a serial bus is often used for data transmission where speed is not critical, in order to reduce the pin count. For this reason, a serial bus has been used between the ROM 17 and the IO adapter 15, between the LAN 18 and the IO adapter 16, as well as between the IO adapters 14 to 16 and the IOU 13 in FIG. 1, for example.

FIG. 2 illustrates an exemplary application of a high-speed serial bus. As illustrated in FIG. 1, serial transmission is often used in the related art for connections with IO devices accessed at comparatively low speeds and similar situations which do not significantly affect the access latency from the CPU 10. However, as computer systems have increased in speed and other performance factors, components which do affect the access latency of the CPU have come to be used, such as the system bus 19-1 connecting the CPU 10 and MCU 11, as well as the system bus 19-2 connecting the MCU 11 and IOU 13, as illustrated in FIG. 2. Serial buses have come to be used for such system buses because the use of serial transmission has an advantage in being immune to bit skew due to differences in wiring lengths, which poses a problem for parallel transmission.

In interfaces that transmit data using a serial bus, the transmitter circuit connected to the serial bus transmits by first converting parallel data into serial data. The receiver circuit connected to the serial bus receives the data transmitted as serial data by restoring the data to parallel data. When transmitting data using such a serial bus, it is desired for reference positions in the parallel data to be matched at the transmitter and the receiver. In high-speed serial transmission, for example, a training period is typically provided during the initial stages of operation or at another specific time. During the training period, specific codes are transmitted, and preparations are made for data communication. Thus, the process to match the reference positions in the parallel data at the transmitter and the receiver is also conducted during such a training period.

In the case of high-speed serial transmission, such as when converting and transmitting 8-bit parallel data as serial data, for example, an 8B10B encoder circuit may be used in some cases to convert the 8-bit data into 10-bit data before transmission. With the 8B10B encoding scheme, the data and clock are transmitting on the same line by embedding clock signal information into the serial data.

With the 8B10B encoding scheme, the numbers of "0" and "1" bits in the data transmitted during serial communication are equalized, thereby maintaining a direct current (DC) balance and making it possible to detect data corruption on the transmission line to some degree. In addition, by converting 8-bit data into 10-bit data, it becomes possible to transmit special codes that carry special meanings different from the transmitted data. Such special codes may be endowed with special meanings and used for control or other functions during data transmission. Furthermore, such special codes are utilized to match data boundaries at the transmitter and the receiver.

Japanese Patent No. 3094973 discloses technology configured to target specific comma signals included in serial data encoded with 8B10B, and synchronize words in incoming data by detecting whether or not comma signals are included in input serial data. Meanwhile, Japanese Unexamined Patent Application Publication No. 2009-94891 discloses technology configured to detect specific codes included in serial data by means of a pattern detector made up of two ring buffers, and determine times for acquiring the serial data as parallel data.

However, in the related art, high-speed data transmission of 10 gigabits per second (Gbps) or greater is problematic because of insufficient operating speed in the circuit for detecting the boundaries of the transmission data. In addition, when serial communication is used in a system bus or similar component, it is also desired to minimize access latency. Consequently, it is desirable to realize high-speed serial transmission while reducing access latency.

Related arts are disclosed in Japanese Patent No. 3094973 and Japanese Laid-open Patent Publication No. 2009-94891.

SUMMARY

A serial data receiver circuit apparatus configured to receive serial data delimited by a first bit length, the circuit apparatus includes: a serial/parallel converter circuit configured to convert the serial data into parallel data of a second bit length that is smaller than the first bit length; a data hold circuit configured to hold a plurality of parallel data; a detector circuit configured to detect a delimiter position in the received serial data; a detected position hold circuit configured to generate a select signal to select data included in the parallel data stored in the data hold circuit; and a selector circuit configured to select data in units of the second bit length starting from the data delimiter position based on the select signal.

The object and advantages of the various embodiments will be realized and attained at least by the elements, features, and combinations particularly pointed out in the claims.

It is to be understood that both the foregoing general description and the following detailed description are exemplary and explanatory and are not restrictive of the various embodiments, as claimed.

DESCRIPTION OF EMBODIMENTS

When realizing high-speed serial transmission, such as when conducting serial transmission by using the above 8B10B transmission encoding method, for example, it is conceivable to use a method wherein the serial data is first simply converted into parallel data at the receiver, and then the 10-bit boundaries are detected.

Figure 1:
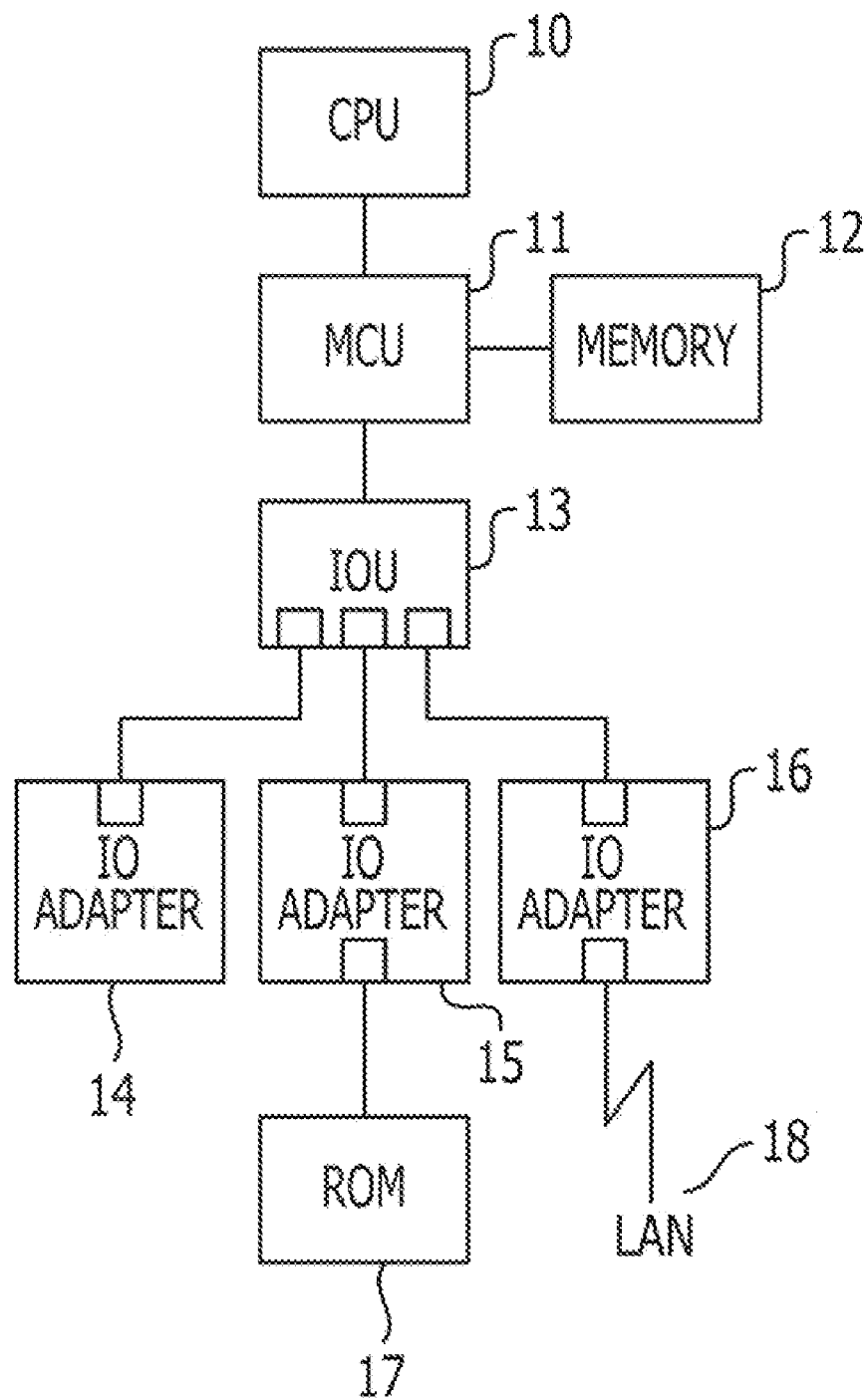
FIG. 1 illustrates an exemplary application of a serial bus of the related art.
Figure 2:
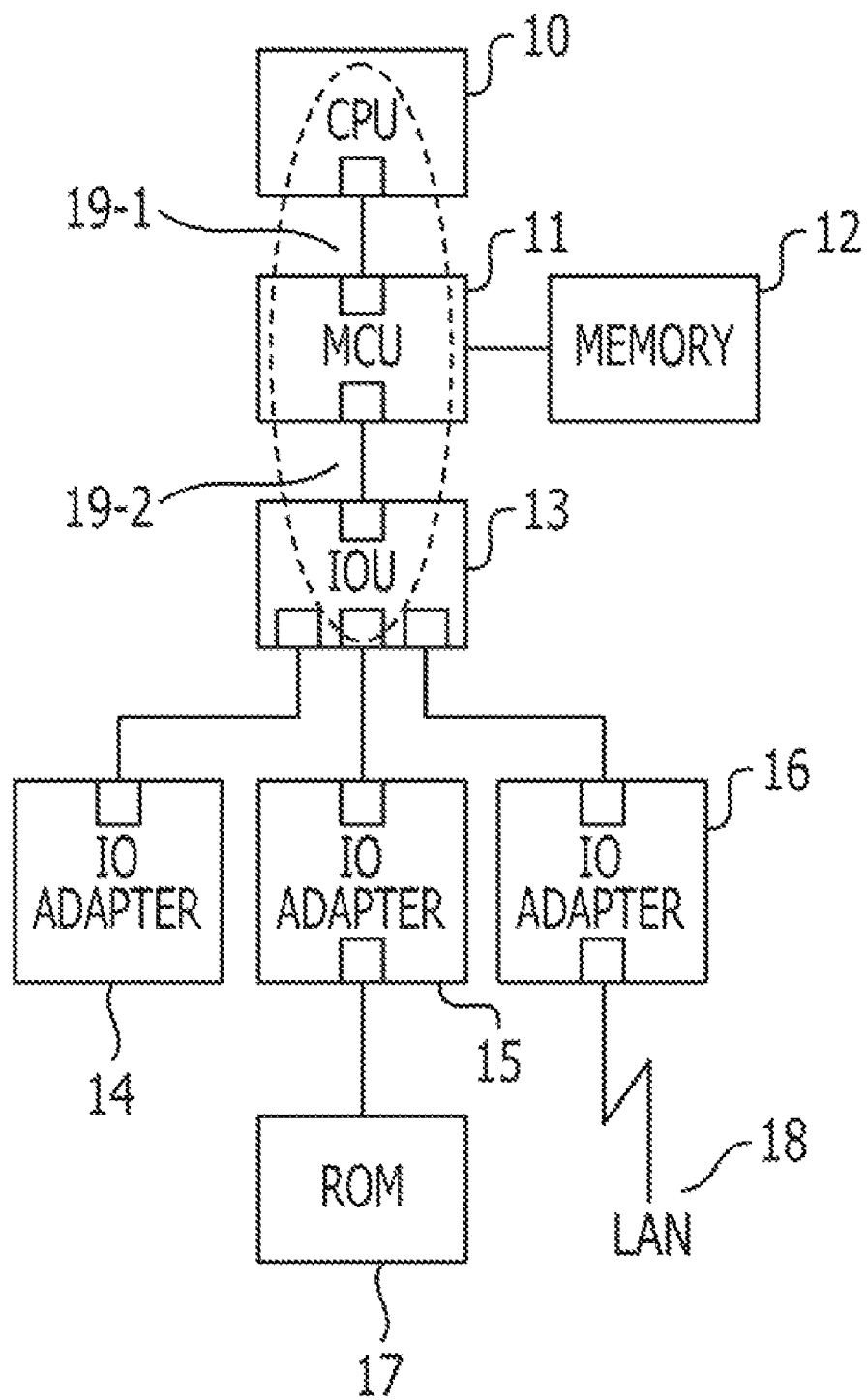
FIG. 2 illustrates an exemplary application of a high-speed serial bus.
Figure 3:
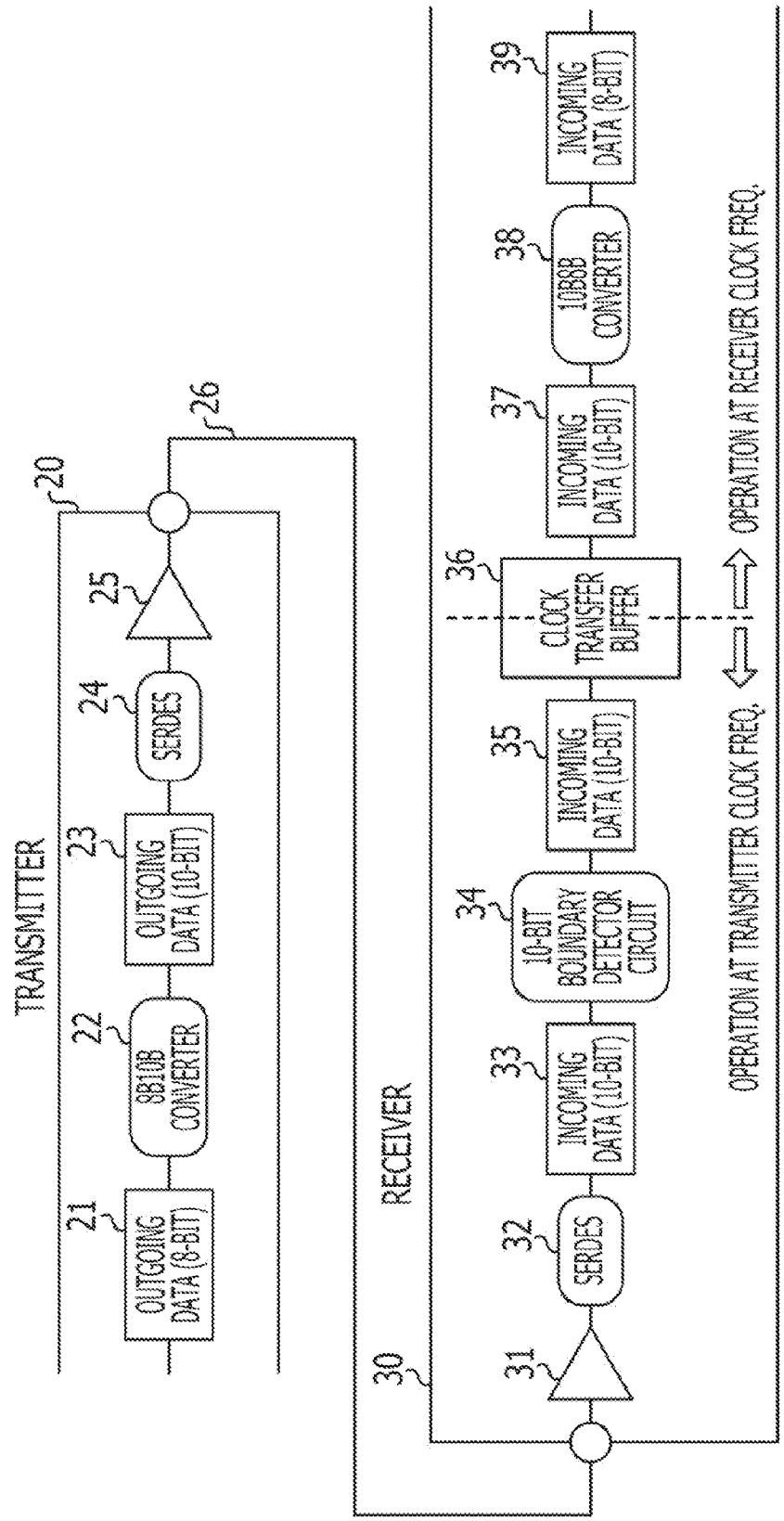
FIG. 3 illustrates a functional overview of an exemplary high-speed serial bus receiver.

FIG. 3 illustrates an exemplary high-speed serial bus receiver. FIG. 3 illustrates a functional overview of an exemplary application for the case where received serial data is first simply converted into parallel data at the receiver, and then the 10-bit boundaries are detected. In the example illustrated in FIG. 3, a transmitter 20 serializes 8-bit parallel data, and transmits the serial data to a receiver 30 via a serial bus 26. The receiver 30 takes the serial data received via the serial bus 26, and converts the serial data into parallel data. The received data is then processed as prescribed in internal circuits of the receiver 30. Hereinafter, the data conversion and other operations conducted in the transmitter 20 and the receiver 30 will be specifically described.

In the transmitter 20, an 8B10B converter circuit 22 takes the 8-bit parallel signal output from an 8-bit outgoing data hold register 21, and converts the 8-bit data into 10-bit data by following specified conversion rules. A 10-bit outgoing data hold register 23 stores the 10-bit data converted by the 8B10B converter circuit 22. A SerDes (SERializer/DESerializer) circuit 24 takes the 10-bit parallel data output from the outgoing data hold register 23, and converts the parallel data into serial data by following a specified scheme. The converted serial data obtained by the SerDes circuit 24 is output to the serial bus 26 via a buffer 25. The buffer 25 is a driver buffer, and may also be a differential buffer. The serial bus 26 refers to a serial-format bus in which a serial transmission protocol is used, such as IEEE 1394, Universal Serial Bus (USB), Serial Advanced Technology Attachment (SATA), or PCI Express.

In the receiver 30, serial data transmitted via the serial bus 26 is received by a buffer 31. The buffer 31 is an incoming buffer, and may also be a buffer that receives data signals transmitted as differential signals.

A SerDes circuit 32 takes the serial data received by the buffer 31, and converts the serial data into 10-bit parallel data. When converting data in the SerDes circuit 32, the serial data is converted into parallel data in 10-bit units, irrespectively of the data boundaries in the received serial data. The converted parallel data obtained by the SerDes circuit 32 is stored in a 10-bit incoming data register 33 at specified times. The incoming data register 33 is realized by a plurality of 10-bit registers hereinafter described, and sequentially stores parallel data output from the SerDes circuit 32.

The data in stored in 10-bit units in the incoming data register 33 is not limited to being data whose boundary positions match those of the 10-bit data that was converted by the 8B10B converter circuit 22 in the transmitter 20. Consequently, the boundary positions in the data received at the receiver 30 is detected. From the parallel data stored in the incoming data register 33, a 10-bit boundary detector circuit 34 detects special codes included in the data transmitted from the transmitter 20 to the receiver 30. These special codes are used to detect data boundary positions, and are a subset of the special codes used for control and other functions when transmitting data. By detecting these special codes for detecting data boundary positions, the 10-bit boundary detector circuit 34 detects data boundary positions of each 10-bit sequence in the transmitted data. Based on information regarding the data boundaries detected by the 10-bit boundary detector circuit 34, 10-bit sequences of data enclosed by the detected data boundaries are taken out of the incoming data register, and stored in a 10-bit incoming data register 35. At this point, data latching by the incoming data register 35 may also be omitted.

Although not illustrated in FIG. 3, the SerDes circuit 32 also recovers the clock from the received serial data when converting incoming data. This recovered clock is used by components such as the SerDes circuit 32 and the 10-bit incoming data register 33. Also, although not illustrated in the drawings, a divided clock is generated from the recovered clock at a specified frequency division ratio. This divided clock is used as the operational clock in components such as the incoming data register 33, the 10-bit boundary detector circuit 34, the incoming data register 35, and a clock transfer buffer 36 hereinafter described. For example, when received serial data is converted into parallel data in 10-bit units in the SerDes circuit 32, a divided clock may be generated and used by dividing the recovered clock by a factor of 10. The recovered clock and its divided clocks are basically synchronized with the clock at the transmitter 20, and differ from the clock used at the receiver 30.

Meanwhile, in many cases a transmitter 20 and a receiver 30 connected via an Ethernet (registered trademark) or other serial bus 26 will be installed at distant positions, and their clocks will be generated by clock oscillators that differ for each individual apparatus, even when the apparatus are made to operate at the same operating frequency. When different clock oscillators are used at the transmitter and the receiver, the individual differences in the clock oscillators might cause a slight offset to occur in the clock frequencies. In order to absorb this clock offset and transfer to the clock at the receiver 30, a clock transfer buffer 36 is used.

In the clock transfer buffer 36, the clock of the receiver 30 (i.e., the receiver clock) is input in addition to the divided clock that was obtained by dividing the clock recovered from the serial data received from the transmitter 20. With these inputs, the incoming data is clock transferred. More specifically, parallel data is output from the incoming data register 35, which operates at the divided clock frequency (i.e., the transmitter clock), and written to a write port of the clock transfer buffer 36, which operates at the same divided clock frequency. The data written to the clock transfer buffer 36 is then read from a read port, which operates at the receiver clock frequency, and stored in a 10-bit incoming data register 37, which also operates at the receiver clock frequency. In this way, incoming data is written to the clock transfer buffer 36 at the transmitter clock frequency, and the written data is then read from the clock transfer buffer 36 at the receiver clock frequency. In so doing, the incoming data is clock transferred.

The 10-bit data stored in the incoming data register 37 is additionally converted into 8-bit data by a 10B6B converter circuit 38 by following specified conversion rules, and then stored in an 8-bit incoming data register 39. In this way, data is transmitted from the transmitter 20 to the receiver 30 via the serial bus 26.

The respective registers 21, 23, 33, 35, 37, and 39 in FIG. 3 do not have to be registers made up of a plurality of flip-flops, and may also be realized by memory or a plurality of latches (this similarly applies to the respective registers hereinafter described). Furthermore, since it is assumed that the transmitter and receiver circuits are configured for high-speed operation for the purpose of conducting high-speed serial transmission, FIG. 3 illustrates a configuration where data is latched at registers between each of the various data processing operations. However, in cases where operational speed requirements are satisfied, such as when high-speed operation is not sought, it is also possible to design circuit layouts that omit components such as the registers 21, 35, 37, and 39, for example.

Figure 4:
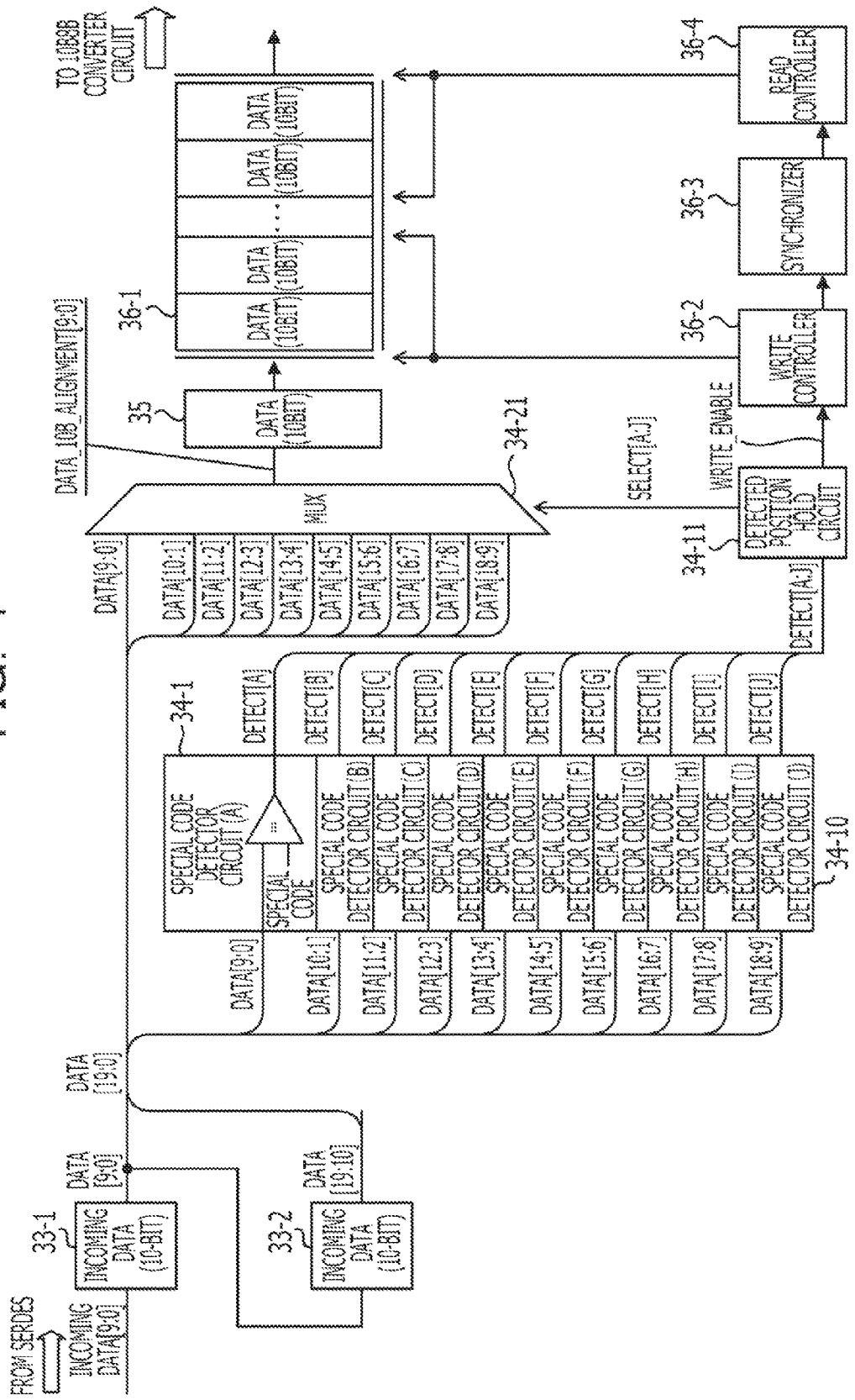
FIG. 4 illustrates a 10-bit boundary detector circuit and a 10-bit data selector circuit in accordance with an exemplary high-speed serial bus receiver.

FIG. 4 illustrates a detailed circuit layout from the incoming data register 33 to the clock transfer buffer 36 in the receiver 30 illustrated in FIG. 3. The incoming data register 33 includes two 10-bit registers 33-1 and 33-2, and 10-bit data sent from the SerDes circuit 32 is sequentially stored in the registers 33-1 and 33-2. As described earlier, serial/parallel conversion is conducted in the SerDes circuit 32 irrespectively of the 10-bit boundary positions in the received serial data. For this reason, once the serial data has been converted into parallel data in 10-bit units in the SerDes circuit 32, it is desired to place the incoming data into at least two 10-bit registers 33-1 and 33-2, and detect the boundary positions in the data. In other words, since the data boundaries in the 19-bit data sequence (Data[18:0]) stored in the two registers 33-1 and 33-2 exist at unknown positions, the 19-bit data sequence is checked in ten 10-bit units offset from each other by one bit each, with each 10-bit sequence being individually checked to detect whether or not that sequence matches a special code for detecting data boundary positions.

In order to detect where the boundary positions of the incoming data exist in the 19-bit data sequence (Data[18:0]), a special code detector circuit 34 includes 10 special code detector circuits, from a special code detector circuit (A) 34-1 to a special code detector circuit (J) 34-10. In the special code detector circuit (A) 34-1, a comparison is made to determine whether or not a 10-bit signal Data[9:0] input into the special code detector circuit (A) matches the special code for detecting data boundary positions. If there is a match, an output signal detect[A] is asserted. The nine remaining special code detector circuits (B) to (J) have circuit layouts similar to that of the special code detector circuit (A), and respectively receive one of the ten 10-bit sequences offset from each other by one bit each. In other words, the remaining nine 10-bit data sequences from Data[10:1] to Data[18:9] are respectively input into the special code detector circuits (B) to (J). Each of the special code detector circuits (B) to (J) makes a comparison to determine whether or not the particular 10-bit data sequence from Data[10:1] to Data[18:9] input into that circuit matches a special code. If there is a match, a corresponding detect[B:J] signal is asserted.

Among the detect signals (detect[A:J]) output from each of the special code detector circuits 34-1 to 34-10, the detect signals output from a detector circuit that detected a special code are asserted, with the remaining detect signals being deasserted. In other words, when the signal polarity of the detect signals is High-Active, for example, the detect signals output from a detector circuit that detected a special code become 1, while the detect signals output from the other detector circuits become 0.

The combined detect signal (detect[A:J]) output from the special code detector circuits 34-1 to 34-10 is input into a detected position hold circuit 34-11. The detected position hold circuit 34-11 may be configured such that, when a change occurs in the input detect signal (detect[A:J]), the content of the changed detect signal is recorded over the previously held detect signal. The content of the detect signal is then held until another change occurs. The content held by the detected position hold circuit 34-11 may be information indicating which detect signals are asserted.

Based on the content of the held detect signal, the detected position hold circuit 34-11 generates a select signal Select[A:J], which indicates which portions of the data (Data[19:0]) stored in the incoming data registers 33-1 and 33-2 are 10-bit data sequences delimited by boundaries. Herein, the select signal Select[A:J] is described as a 10-bit signal, but the select signal may also be a 4-bit signal that indicates which bit positions are delimiter positions using hexadecimal or another format.

A selector 34-21 uses the select signal Select[A:J] to select the boundary-delimited 10-bit data sequences from among the data (Data[19:0]) stored in the incoming data registers 33-1 and 33-2, and outputs the result as a Data_10B_Alignment[9:0] signal. The 10-bit Data_10B_Alignment[9:0] signal output from the selector 34-21 is temporarily held in the 10-bit incoming data register 35, and subsequently written to a clock transfer buffer 36-1. Operations related to the clock transfer buffer 36 will now be described with the use of FIG. 5.

Figure 5:
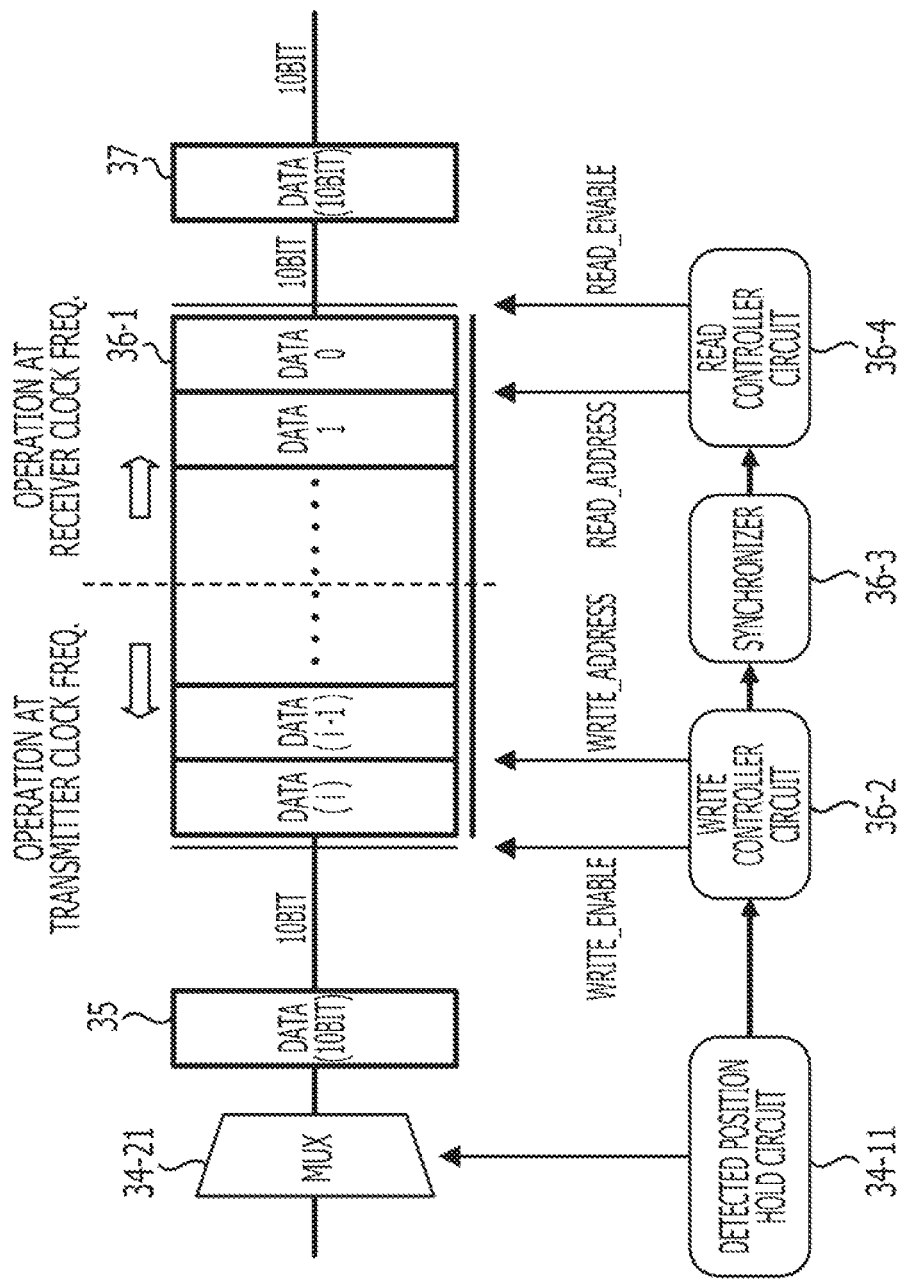
FIG. 5 illustrates an overview of a clock transfer buffer in accordance with an exemplary high-speed serial bus receiver.

FIG. 5 is a diagram illustrating the operation of the clock transfer buffer 36. In FIG. 5, the detected position hold circuit 34-11, the selector 34-21, the data register 35, the write controller circuit 36-2, and the write port of the clock transfer buffer 36-1 all operate based on the transmitter clock (i.e., the divided clock). For this reason, the 10-bit data held in the data register 35 is written to the clock transfer buffer 36-1 using the divided clock. In contrast, the read port of the clock transfer buffer 36-1, the synchronizer circuit 36-3, the read controller circuit 36-4, and the data register 37 all operate based on the receiver clock (i.e., the operational clock of the receiver 30).

The clock transfer buffer may also be a FIFO (First In, First Out) buffer, a ring buffer, or two-port RAM capable of reading and writing with separate clocks. The clock transfer buffer 36 may also be realized by a plurality of registers.

Based on the select signal output from the detected position hold circuit 34-11, the write controller circuit 36-2 generates a control signal for writing data to the clock transfer buffer 36-1. More specifically, based on information in the select signal from the detected position hold circuit 34-11, the write controller circuit 36-2 determines whether or not to write data to the clock transfer buffer 36-1, as well as write times, and output a Write_Enable signal that allows writing to the clock transfer buffer 36-1. While the Write_Enable signal is asserted, the write controller circuit 36-2 also outputs a Write_Address signal, which indicates the addresses to be written to in the clock transfer buffer 36-1. While the Write_Enable signal is asserted, the boundary-delimited 10-bit data held in the data register 35 is written to the address regions of the write port of the clock transfer buffer 36-1 indicated by the Write_Address signal.

The synchronizer circuit 36-3 takes the control signal for writing data to the clock transfer buffer 36-1 that was generated in synchronization with the transmitter clock in the write controller circuit 36-2, and synchronizes the write control signal with receiver clock by using a circuit that operates at the receiver clock frequency.

The read controller circuit 36-4 receives the synchronized signal obtained as a result of the synchronizer circuit 36-3 synchronizing the write control signal generated by the write controller circuit 36-2, and generates a control signal for reading data from the clock transfer buffer 36-1. More specifically, the read controller circuit 36-4 uses the control signal that was synchronized by the synchronizer circuit 36-3 to determine whether or not 10-bit incoming data is being stored in specified address regions of the clock transfer buffer 36-1. Then, when a time is reached to read the 10-bit incoming data stored in the clock transfer buffer 36-1, the read controller circuit 36-4 outputs a Read_Enable signal that allows reading from the clock transfer buffer 36-1. The read controller circuit 36-4 outputs the Read_Enable signal so as to match the operational clock timings of the receiver 30. While the Read_Enable signal is asserted, the read controller circuit 36-4 also outputs a Read_Address signal, which indicates the addresses to read from in the clock transfer buffer 36-1. While the Read_Enable signal is asserted, 10-bit data is read from the read port of the clock transfer buffer 36-1 in accordance with the address values indicated by the Write_Address signal.

The data read from the read port of the clock transfer buffer 36-1 is written to the 10-bit data register 37, which operates at the receiver clock frequency. In this way, the boundary-delimited 10-bit data is clock transferred.

Meanwhile, as described earlier, if clock oscillators that differ for each apparatus are used, then the individual differences in the clock oscillators might cause a slight offset to occur in the frequencies of the transmitter clock and the receiver clock, even when the transmitter 20 and the receiver 30 are made to operate at the same frequency. Such an offset between the transmitter clock and the receiver clock can be absorbed by using the clock transfer buffer 36.

More specifically, as described earlier, particular special codes may be transmitted together with communication data in the 8B10B encoding scheme. For this reason, it is possible to insert special codes for timing adjustment into the transmission data. These special codes for timing adjustment may cause the reading of data from the read port of the clock transfer buffer 36-1 to be skipped. The offset between the transmitter clock and the receiver clock can be detected by using a specific detector circuit (not illustrated in the drawings) to detect the differences in the write addresses and the read addresses of the clock transfer buffer 36-1. When a clock offset is detected, a special code for timing adjustment is used to skip reading from the clock transfer buffer 36-1, or alternatively, to delay reading from the clock transfer buffer 36-1. In so doing, the clock offset can be corrected.

Figure 6:
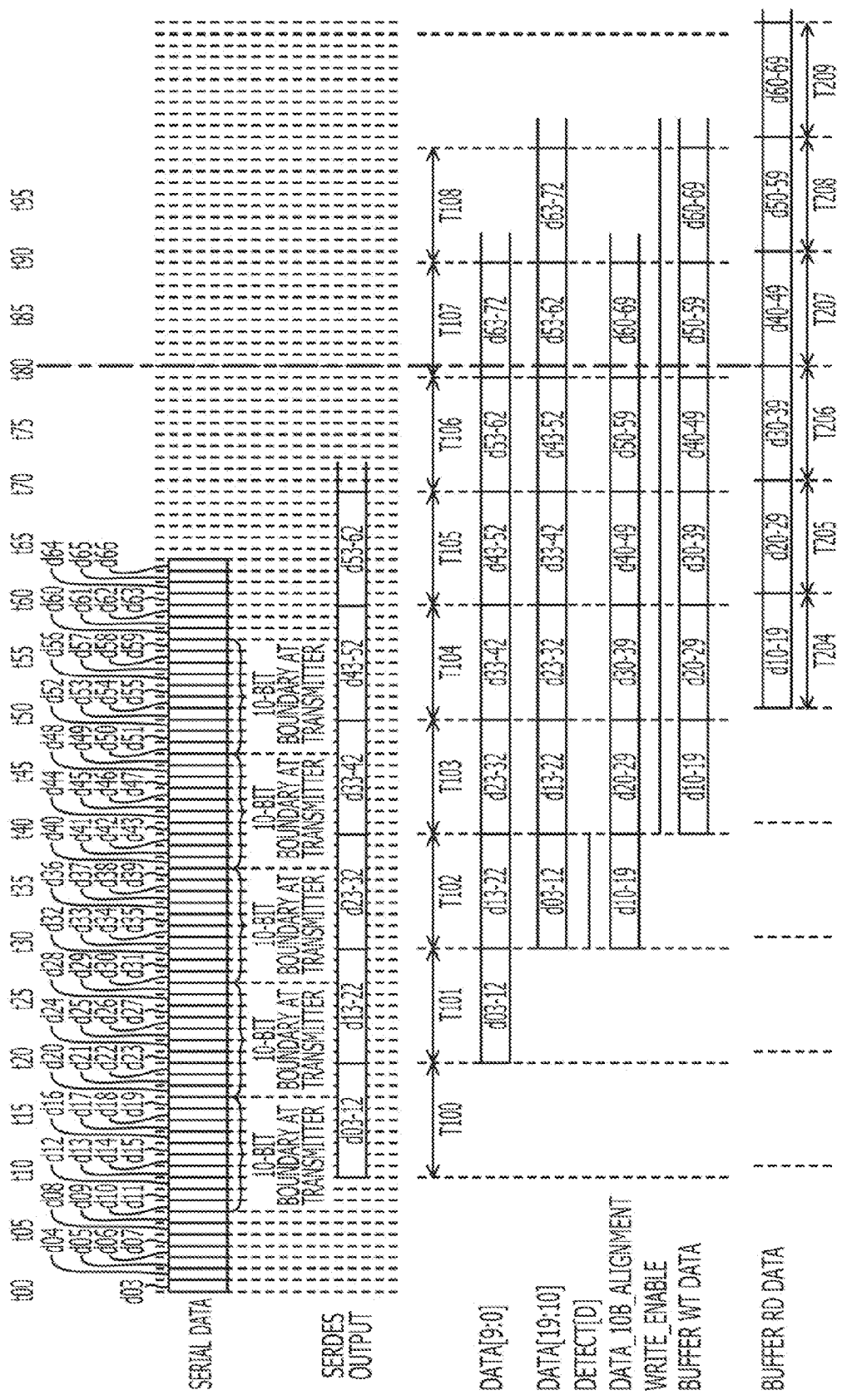
FIG. 6 illustrates a timing chart for a serial data receiver circuit in accordance with an exemplary high-speed serial bus receiver.

FIG. 6 illustrates a timing chart for a serial data receiving process in the receiver 30. In FIG. 6, the uppermost row (Serial Data) illustrates how, from time t00 to t63, the serial data d03 to d66 is input into the receiver 30 one bit at a time, in synchronization with an operational clock for high-speed serial data communication. The data from d66 onwards is also sequentially input into the receiver 30, but will be omitted from the description of FIG. 6. For the sake of convenience, it is assumed that the serial data sent from the transmitter 20 is delimited by data boundaries into the following units: d10 to d19, d20 to d29, d30 to d39, d40 to d49, and d50 to d59. Additionally, it is assumed that the data sequence from d10 to d19 includes a special code for detecting boundary positions in the incoming data. Hereinafter, operation of the receiver 30 will be described while comparing the respective circuits in FIGS. 3 and 4 against FIG. 6.

The SerDes circuit 32 conducts serial/parallel conversion in 10-bit units, and irrespectively of the data boundary positions in the serial data input into the receiver 30. For example, the SerDes circuit 32 may conduct serial/parallel conversion of a 10-bit unit such as the serial data from d03 to d12 in FIG. 6, and output the 10-bit parallel data d03-12 (SerDes Output). During the period T100 that lasts until the serial/parallel conversion of the next 10-bit unit of serial data from d13 to d22, the SerDes circuit 32 holds the converted 10-bit parallel data d03-12. The SerDes circuit 32 similarly converts subsequent serial data into successive units of parallel data, and successively outputs the converted parallel data (d13-22, d23-32, d33-42, d43-52, and d53-d62) over the periods T101 to T105.

The SerDes circuit 32 recovers the clock from the received serial data, and generates a divided clock that matches the serial/parallel conversion timings. If the frequency division ratio of this divided clock is assumed to be 10, then the period of the divided clock matches the length of the respective periods T100 to T108 in FIG. 6.

The incoming data register 33-1 latches the parallel data output from the SerDes circuit 32 at timings synchronized with the 1/10 clock, and during period T101, outputs d03-12 to the Data[9:0] output. The incoming data register 33-2 latches the Data[9:0] output from the incoming data register 33-1, and during period T102, outputs d03-12 to Data[19:10].

During T102, the incoming data registers 33-1 and 33-2 output the bits from d03 to d22, and thus detection of the special code from d10 to d19 is conducted in each of the special code detector circuits 34-1 to 34-10. In the example illustrated in FIG. 6, d03 and d22 output from the incoming data register 33 are stored in Data[19] and Data[0], respectively, and the data sequence from d10 to d19 including the special code is included in Data[12:3]. For this reason, the special code detector circuit (D) detects the special code. Consequently, during T102, the detect signal detect[D] output from the special code detector circuit (D) is asserted. In FIG. 6, the horizontal line drawn to the right of the detect[D] signal indicates that the detect[D] signal is being asserted.

The detected position hold circuit 34-11 generates a select signal for the selector 34-21 based on the detect signal detect [D], and holds the generated select signal during T103 and subsequent periods until the next change occurs in detect[A: J]. During T102 and subsequent period, the selector 34-21 selects Data[12:3] (i.e., d10-19) based on the select signal output from the detected position hold circuit, and outputs the result as Data_10B_Alignment[9:0], which expresses data delimited at 10-bit boundaries. Data_10B_Alignment[9:0] is latched by the 10-bit data register 35, and during T103, is held as Buffer_WT_Data[9:0], which expresses write data to be written to the clock transfer buffer 36-1.

As described earlier, the receiver clock (i.e., the clock at the receiver 30) might be offset with respect to the transmitter clock. In FIG. 6, the periods synchronized with the receiver clock, such as T204 to T209, are illustrated as being offset with respect to the periods synchronized with the transmitter clock, such as T100 to T108.

At the time when the transmitter clock period T103 ends, the 10-bit data d10-19 is being stored in the clock transfer buffer 36-1. Consequently, at the read port of the clock transfer buffer 36-1, the 10-bit data d10-19 is read (Buffer_RD_Data[9:0]) in synchronization with the receiver clock during the period T204 occurring after T103. Subsequent 10-bit data sequences such as d20-29, d30-39, d40-49, d50-59, and d60-69 are similarly read to the receiver 30 via the clock transfer buffer.

Serial data after d66 is not illustrated in FIG. 6, but in an actual data transmission, data continues to be transmitted after d66, and is received at the receiver 30 via components such as the clock transfer buffer 36-1. Although special codes such as d10-19 are transmitted during the training period or similar timing, the boundary positions in the incoming data become equally spaced once the special code in d10-19 is detected, and thus it is possible to correctly receive a normal data transmission following the training period.

As described above, serial data transmitted at high speed via the serial bus 26 is serial/parallel converted in the SerDes circuit 32 without being first subjected to a process for detecting incoming data boundaries. Detection of the boundary positions in the incoming data and other processes are then conducted using a comparatively low-speed divided clock. In so doing, it becomes possible to accommodate high-speed serial communication of 10 Gbps or more, for example.

Meanwhile, in the above example, transmitted data is serial/parallel converted in 10-bit units matching the boundary positions in the transmitted data, and then the detection of boundary positions and other processes are conducted. However, from the perspective of decreasing the access latency of the CPU, it is desirable to conduct the above processes during a period that is shorter than that of the data receiving process in the receiver 30. In order to meet this demand, the embodiment described below represents a serial transmission method than makes possible not only the high-speed serial transmission technique in accordance with the foregoing example, but additionally makes it possible to decrease the access latency.

Figure 7:
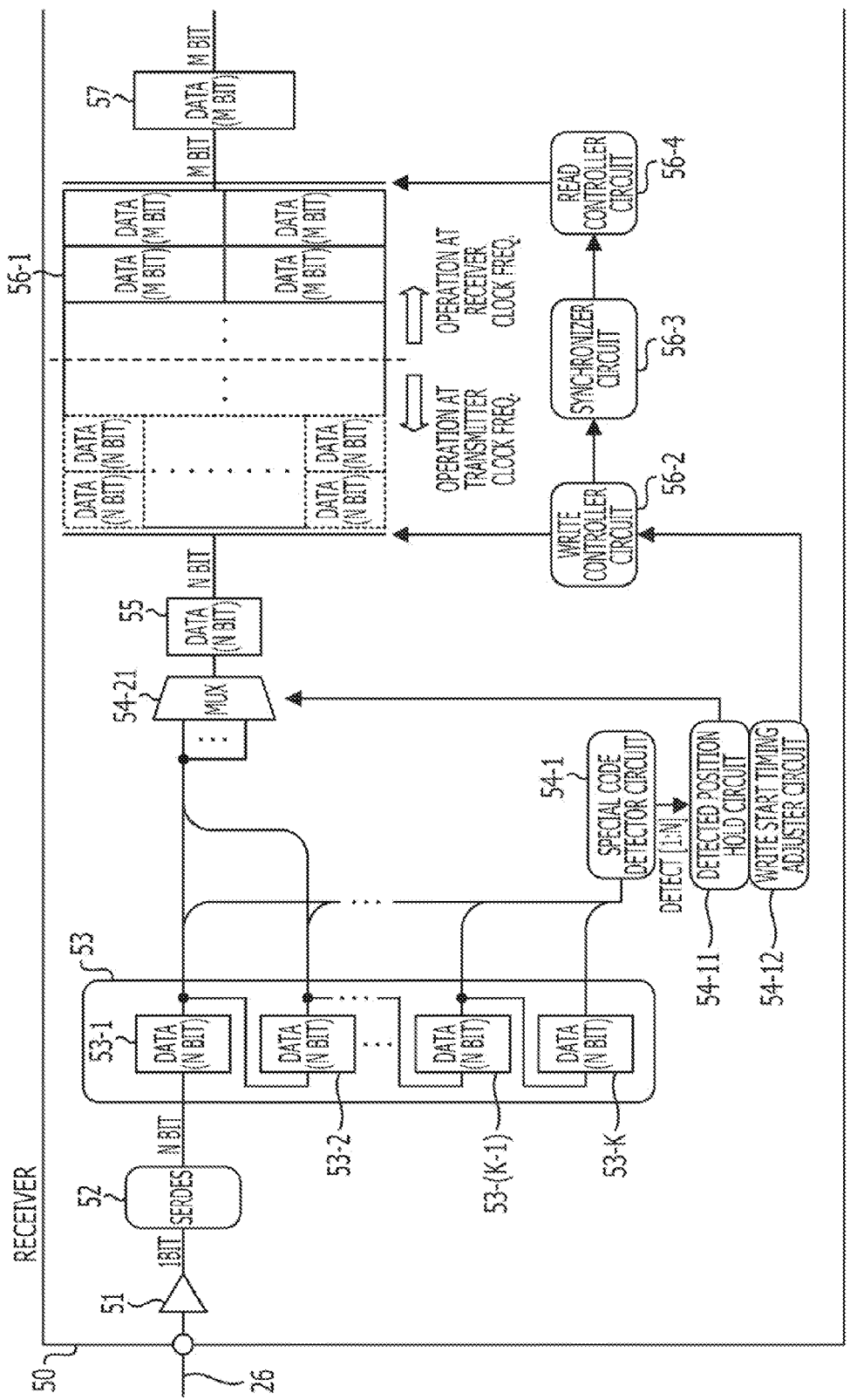
FIG. 7 illustrates a functional overview in accordance with an embodiment.

FIG. 7 illustrates a functional overview of an embodiment for detecting boundary positions in incoming data at low latencies in a receiver 50 in accordance with an embodiment. In FIG. 7, data transmitted via the serial bus 26 is illustrated as being delimited every M bits. Incoming serial data from the serial bus 26 is input into a SerDes circuit 52 via a buffer 51. The SerDes circuit 52 takes input serial data, and serial/parallel converts the data in units of N bits, where N is a number of bits that is smaller than the M bits delimiting incoming data. By detecting data boundary positions in the incoming data and conducting other processes in units of N bits which are smaller than M bits, it becomes possible to shorten the amount of time until data in M-bit units and delimited at the boundary positions is retrieved from received serial data.

Parallel data in N-bit units that has been converted by the SerDes circuit 52 is sequentially stored in a shift register having K (where K is a positive integer) N-bit data registers 53-1 to 53-K, which together form an incoming data register 53. Since the incoming data was serial/parallel converted in N-bit units at the SerDes circuit 52 irrespectively of the boundary positions in the incoming data, at this point, the boundary positions in the incoming data are detected. Consequently, the number K of data registers 53-1 to 53-K is determined such that the total bit length of data than can be stored in the plurality of N-bit registers 53-1 to 53-K is at least equal to the number expressed by (M+N−1). In the example in FIG. 7, the incoming data register 53 is illustrated as a shift register, but a circular buffer or similar configuration may also be implemented.

The series of data stored in the incoming data register 53 is input into a special code detector circuit 54-1, which detects whether or not an M-bit data sequence in the series of data matches a special code for detecting boundary positions in the incoming data. More specifically, in the special code detector circuit 54-1, the detection of a match or non-match with the special code is individually made for each of N data sequences, wherein the N respective data sequences are M bits in length and offset from each other by one bit each. Consequently, the special code detector circuit 54-1 includes N detector circuits (not illustrated in FIG. 7) for detecting whether or not one of the N M-bit data sequences matches the special code. The data stored in the incoming data register 53 is input into the N detector circuits of the special code detector circuit 54-1 as N M-bit data sequences offset from each other by one bit each, and each detector circuit detects whether or not its particular M-bit data sequence received as input matches the special code. If the special code is detected in one of the N detector circuits, then the special code detector circuit 54-1 notifies a detected position hold circuit 54-11 with a detect signal (detect[1:N]), which represents information indicating the detected position of the special code that could be identified from the detection results.

The detected position hold circuit 54-11 holds the information indicating the detected position of the special code that was obtained by the detect signal generated by the special code detector circuit 54-1, and generates a select signal Select[1:N] for a selector 54-21. More specifically, based on information regarding boundary delimiter positions in the incoming data, the detected position hold circuit 54-11 generates a select signal for selecting a specific N-bit sequence from among the data output from the incoming data registers 53-1 and 53-2, such that the processing latency is reduced in the receiver 50. The details of the process for reducing the processing latency will be described later.

Using the select signal generated by the detected position hold circuit 54-11, the selector 54-21 selects an N-bit data sequence based on the detected delimiter positions from among the 2N bits output by the data registers 53-1 and 53-2. The data register 55 latches the N-bit data sequence selected by the selector 54-21, and outputs write data to a clock transfer buffer 56-1.

Based on the detect signal generated by the special code detector circuit 54-1, a write start timing adjuster circuit 54-12 determines when the next N-bit data sequence will appear in the selector 54-21. More specifically, the next N-bit data sequence is the data starting from the boundary position of the next M-bit data after the boundary position that was detected by the special code detector circuit 54-1. From the determination results, the write start timing adjuster circuit 54-12 generates a control signal for a write controller circuit 56-2.

Based on the control signal generated by the write start timing adjuster circuit 54-12, the write controller circuit 56-2 generates a Write_Enable signal that allows writing to the clock transfer buffer 56-1, and also generates a matching Write_Address signal. While the Write_Enable signal is asserted, data output from the data register 55 is written to the clock transfer buffer 56-1 in accordance with the write addresses indicated by the Write_Address signal. Similarly to the data register 35 in FIG. 4, the data register 55 may also be omitted. In this case, the Write_Enable and other signals generated by the write controller circuit 56-2 will be asserted one cycle earlier.

A synchronizer circuit 56-3 takes the Write_Address and other control signals generated by the write controller circuit 56-2, and synchronizes the signals with the receiver clock. The control signals synchronized by the synchronizer circuit 56-3 are received by a read controller circuit 56-4, the read port of the clock transfer buffer 56-1, and an M-bit data register 57, which all operate in synchronization with the receiver clock. Note that in the embodiment illustrated in FIG. 7, it is not needed for the transmitter clock and the receiver clock to have the same frequency, and clocks having a clock cycle ratio of N:M may be used, for example.

Based on the Write_Address and other signals synchronized by the synchronizer circuit 56-3, the read controller circuit 56-4 generates control signals for reading data from the read port of the clock transfer buffer 56-1 at times that allow reading of data delimited by the M-bit boundary positions. Although not illustrated in FIG. 7, the read controller circuit 56-4 outputs a Read_Enable signal that allows reading, as well as a Read_Address signal. These signals are output at timings that allow reading of data in M-bit units from the read port of the clock transfer buffer 56-1. While the Read_Enable signal is asserted, data is read from the read port of the clock transfer buffer 56-1 in M-bit units, in accordance with the read addresses indicated by the Read_Address signal. In so doing, data that has been written to the clock transfer buffer 56-1 in N-bit units can be read as data in M-bit units delimited by boundary positions, while at the same time, clock transfer is conducted in the clock transfer buffer 56-1.

M-bit data read from the read port of the clock transfer buffer 56-1 is written to the M-bit data register 57, which operates at the receiver clock frequency. By conducting the boundary detection process in N-bit units which are smaller than M bits, M-bit data delimited at the boundary positions can be obtained with a smaller processing latency compared to the exemplary circuit illustrated in FIG. 4.

While the configuration in FIG. 7 has been described as a generalized embodiment, detailed operation will now be described in a manner similar to that of FIG. 4, by taking an example of an embodiment that subdivides and processes 8B10B encoded 10-bit data in units of 4 bits.

Figure 8:
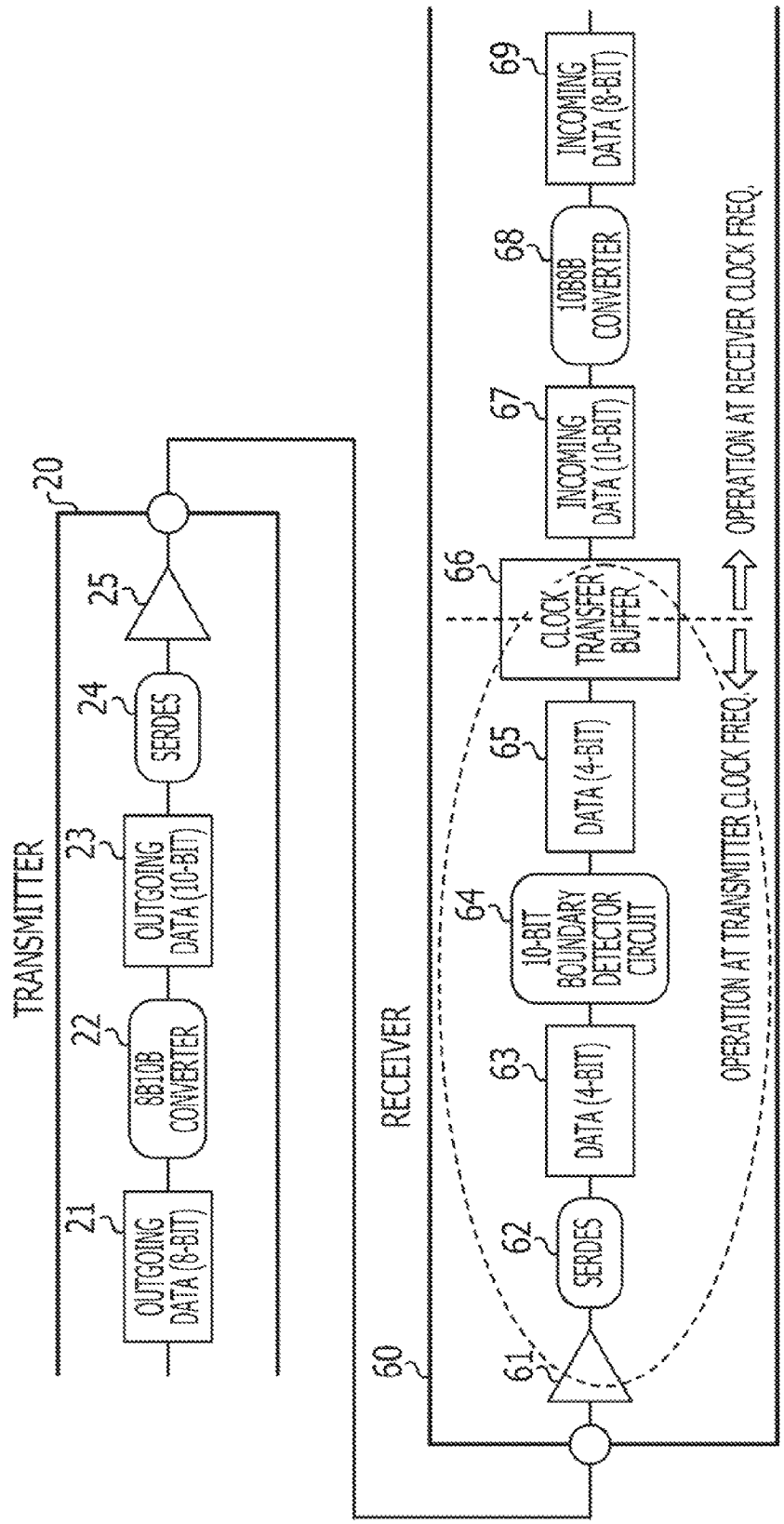
FIG. 8 illustrates a functional overview of an exemplary application of a serial bus in accordance with an embodiment.

FIG. 8 illustrates a functional overview of an exemplary application of a serial bus in accordance with an embodiment. In FIG. 8, the transmitter 20 is the same as the transmitter 20 illustrated in FIG. 3, and thus its description is herein omitted. However, the receiver 60 differs from the receiver 30 illustrated in FIG. 3 in that the circuits enclosed by the broken ellipse in FIG. 8 perform various processing operations with respect to incoming serial data in 4-bit units.

In other words, the SerDes circuit 62 conducts serial/parallel conversion in 4-bit units. The incoming data register 63 includes a plurality of 4-bit data registers, and stores parallel data converted by the SerDes circuit 62 in 4-bit units. Meanwhile, the 10-bit boundary detector circuit 64 detects 10-bit boundary positions in incoming data by four detector circuits (not illustrated). Based on position information regarding the detected data boundaries, a specific 4-bit data sequence is selected from among the data stored in the incoming data register 63, and the selected data is latched in a 4-bit data register 65. Data output from the 4-bit data register 65 is then written to the write port of a clock transfer buffer 66 in 4-bit units.

At the read port of the clock transfer buffer 66, 10-bit data is read at times that allow reading of data in 10-bit units delimited by the boundary positions. The data thus read is then stored in a 10-bit incoming data register 67. In other words, in the clock transfer buffer 66, clock transfer from the transmitter clock to the receiver clock can be conducted, while at the same time, data is converted from four bits to 10 bits. Note that in the embodiment illustrated in FIG. 8, it is not needed for the transmitter clock and the receiver clock to have the same frequency, and clocks having a clock cycle ratio of 2:5 may be used, for example.

The 10-bit data stored in the incoming data register 67 is converted into 8-bit data as a result of a 10B8B converter circuit 68 following specified conversion rules. The final 8-bit incoming data is then stored in an 8-bit incoming data register 69.

Figure 9:
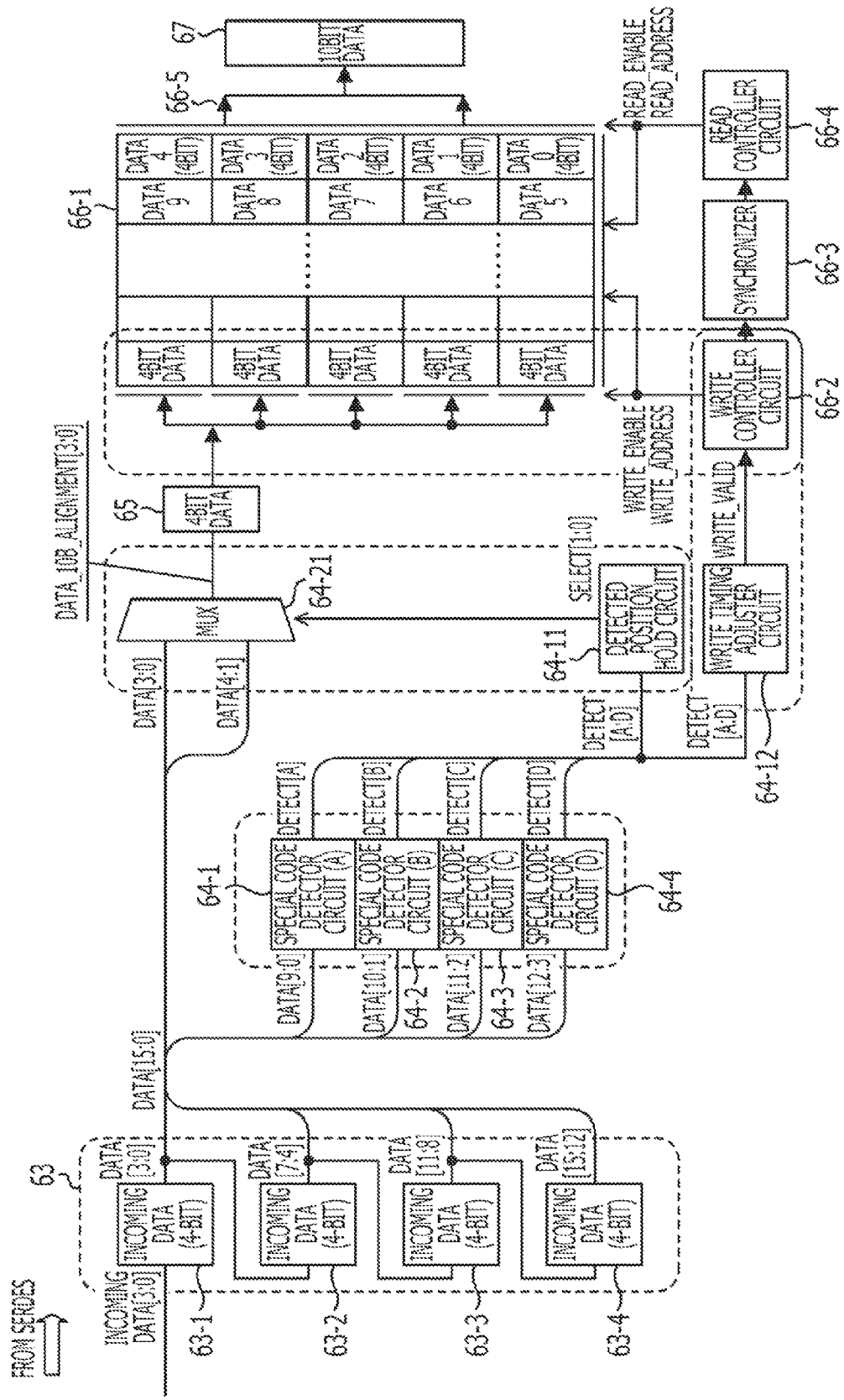
FIG. 9 illustrates a 10-bit boundary detector circuit and a 4-bit data selector circuit in accordance with an embodiment.

FIG. 9 illustrates a detailed circuit layout in a receiver 30 in accordance with an embodiment, from the incoming data register 63 to the 10-bit incoming data register 67 that receives the output data from the clock transfer buffer 66. Compared to the configuration described in FIG. 7, the bit length M of data delimited at the boundary positions in the incoming data is 10 bits in FIG. 9, and the bit length N of the data units converted in the SerDes circuit is 4 bits. Consequently, four is a sufficient number of 4-bit registers forming the incoming data register 63, as four 4-bit registers 63-1 to 63-4 are able to store (M+N−1)=(10+4−1)=13 bits of data. In other words, when handling data in 4-bit units, offsets in the incoming data range from 0 to 3 bits, and 13 bits is sufficient for detecting 10-bit boundaries. Although the incoming data register 63 may be realized by a ring buffer, RAM, or similar component, in FIG. 9 an exemplary configuration is described wherein the incoming data register 63 is realized by a shift register using the data registers 63-1 to 63-4.

The incoming data register 63 includes the four 4-bit registers 63-1 to 63-4, and 4-bit data sent from the SerDes circuit 62 is sequentially stored in the registers 63-1 to 63-4. Stated differently, the 4-bit data sent from the SerDes circuit 62 is shifted and stored in 4-bit units in the registers 63-1, 63-2, 63-3, and 63-4. In so doing, data is arranged in the incoming data register 63 from Data[15], which was sent first, to Data[0], which was sent last.

In the SerDes circuit 62, serial/parallel conversion is conducted in 4-bit units irrespectively of the 10-bit boundary positions in the received serial data. For this reason, the incoming data register 63 and special code detector circuits 64-1 to 64-4 are used to detect the boundary positions in the incoming data. More specifically, four data sequences are retrieved from the incoming data register 63 and respectively input into one of the four special code detector circuits 64-1 to 64-4. These four data sequences are 10 bits in length, and offset from each other by one bit each (Data[9:0], Data[10:1], Data[11:2], Data[12:3]). The special code detector circuits 64-1 to 64-4 each detect whether or not a special code is included in one of the 10-bit data sequences, and output information regarding the detection result in the form of a detect signal (detect[A:D]). If a 10-bit data sequence from among the series of data stored in the incoming data register 63 does contain a special code, then one of the special code detector circuits 64-1 to 64-4 will detect that special code.

A detected position hold circuit 64-11 stores information regarding the detected position of the special code obtained by the detect signal (detect[A:D]) generated by the special code detector circuits 64-1 to 64-4, and generates a select signal Select[1:0] for a selector 64-21 such that the processing latency for the incoming data is reduced. At this point, the select signal may also be a signal that selects the lower four bits of the data sequence (Data[9:0], Data[10:1], Data[11:2], Data[12:3]) where the special code was detected. In other words, the select signal may be a signal that selects Data[3:0], Data[4:1], Data[5:2], or Data[6:3]. However, due to the reasons described later with reference to FIGS. 11 to 14, it is sufficient for the select signal to be a signal that selects either Data[3:0] or Data[4:1]. The select signal is held until the reoccurrence of conditions for re-detecting 10-bit boundaries in the incoming data.

Using the select signal generated by the detected position hold circuit 64-11, the selector 64-21 selects the 4-bit data sequence Data[3:0] or Data[4:1] from among the data stored in the data registers 63-1 to 63-4. Once the special code has been detected and the select signal has been defined, the selector 64-21 continues selecting 4-bit data sequences at the same bit position in accordance with the content of the select signal. The 4-bit data register 65 latches the 4-bit data selected by the selector 64-21.

Based on the detect signal detect[A:D] output from the special code detector circuits 64-1 to 64-4, or based on information regarding the detected position held in the detected position hold circuit 64-11, a write timing adjuster circuit 64-12, determines times for writing data to the clock transfer buffer 66-1. The write timing adjuster circuit 64-12 notifies a write controller circuit 66-2 of the determined write times in the form of, for example, a Write_valid signal for controlling the periods when data can be written to the clock transfer buffer 66-1. The determination of write times will be later described in further detail using FIGS. 11 to 14.

Based on the Write_valid signal generated by the write timing adjuster circuit 64-12, the write controller circuit 66-2 generates a Write_Enable signal that allows writing to the write port of the clock transfer buffer 66-1, and also generates a matching Write_Address signal.

Based on the Write_Enable signal and the Write_Address signal output from the write controller circuit 66-2, the 4-bit data stored in the data register 65 is written to the write port of the clock transfer buffer 66-1 in synchronization with the transmitter clock. At this point, by writing five 4-bit data sequences from a 10-bit boundary in the incoming data to the clock transfer buffer 66-1, two 10-bit data sequences delimited by 10-bit boundaries can be obtained. The 10-bit data thus obtained can then be read from the read port of the clock transfer buffer 66-1 at specified times in synchronization with the receiver clock. In this way, both clock transfer as well as conversion from 4-bit data to 10-bit data can be conducted in the clock transfer buffer 66-1.

A synchronizer circuit 66-3 synchronizes control signals such as the Write_Address signal generated by the write controller circuit 66-2 with the receiver clock. Based on information such as the Write_Address signal synchronized by the synchronizer circuit 66-3, a read controller circuit 66-4 generates control signals for reading data from the read port of the clock transfer buffer 66-1 at times that allow reading of data delimited by the 10-bit boundary positions. Although not illustrated in FIG. 9, the read controller circuit 66-4 outputs a Read_Enable signal that allows reading, as well as a Read_Address signal. These signals are output at times that allow reading of data in 10-bit units from the read port of the clock transfer buffer 66-1.

Operation of a Read_Address signal will now be described, taking by way of example address values that indicates the read port of the clock transfer buffer 66-1 in FIG. 9. Data that has been written to the write port of the clock transfer buffer 66-1 in 4-bit units is read from the read port of the clock transfer buffer 66-1 in 10-bit units.

The first Read_Address value is taken to be the first address number where Data0 is stored, thereby enabling the reading of two 10-bit data sequences from five 4-bit data sequences stored in Data0 to Data 4. The address regions storing a 10-bit data sequence as indicated by this first address number are read from the clock transfer buffer 66-1 and selected by a selector 66-5. In other words, a 10-bit data sequence made up of Data0, Data1, and the two bits in the lower address region of Data2 is read and selected.

Next, the second Read_Address value is taken to be the address number indicating the two bits in the upper address region of Data2, and thus a 10-bit data sequence made up of the lower two bits of Data2, Data3, and Data4 is read from the clock transfer buffer 66-1 and selected by the selector 66-5. A Read_Address signal enabling the reading of two 10-bit data sequences may be similarly determined for Data5 to Data9, and two 10-bit data sequences may be similarly read.

Based on the address values indicated by the Read_Address signal output from the read controller circuit 66-4, the selector 66-5 selects one of the two 10-bit data sequences read from the clock transfer buffer 66-1. The 10-bit data register 67 latches the 10-bit data selected by the selector 66-5. This 10-bit data, delimited by the boundary positions in the incoming data and held in the incoming data register 67, is subsequently converted into 8-bit data by the 10B8B converter circuit 68.

Figure 10:
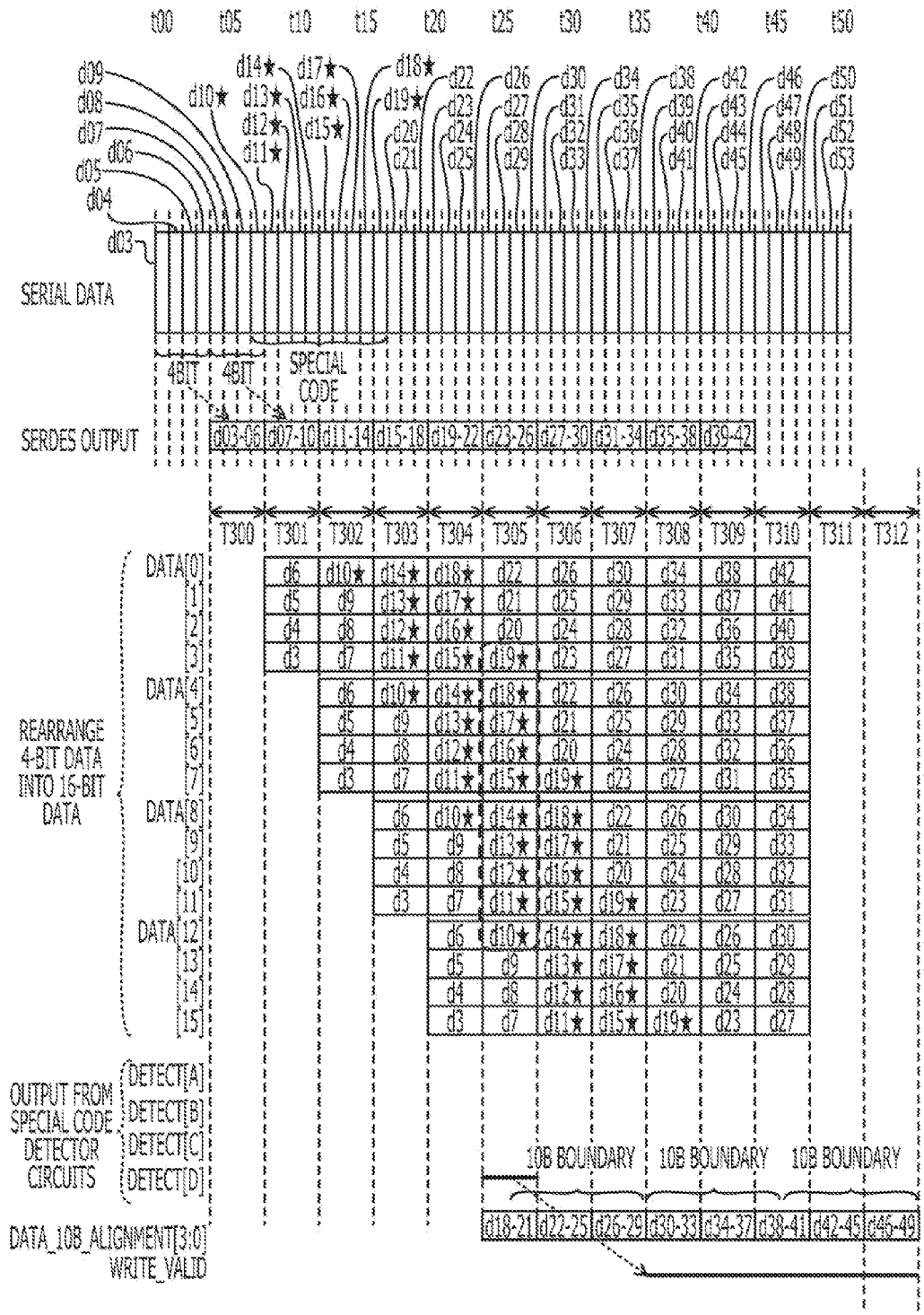
FIG. 10 illustrates a summary timing chart in accordance with an embodiment.

FIG. 10 illustrates an operational timing chart for a serial data receiving process in a receiver 60 of an embodiment. In FIG. 10, the uppermost row (Serial Data) illustrates how, during the period from time too to t50, the serial data d03 to d53 is input into the receiver 60 one bit at a time, in synchronization with an operational clock for high-speed serial data communication. For the sake of convenience, it is assumed that the serial data sent from the transmitter 20 is delimited by data boundaries into the following 10-bit units: d10 to d19, d20 to d29, d30 to d39, d40 to d49, and so on. Additionally, it is assumed that the data sequence from d10 to d19 includes a special code for detecting boundary positions in the incoming data. In FIG. 10, the storage positions of the data constituting the special code are marked with stars for easier understanding. Hereinafter, operation of the receiver 60 will be described while comparing the respective circuits in FIGS. 8 and 9 against FIG. 10.

The SerDes circuit 62 conducts serial/parallel conversion in 4-bit units, and irrespectively of the data boundary positions in the received serial data. For example, the SerDes circuit 62 may conduct serial/parallel conversion of 4-bit units such as the serial data from d03 to d06 and d07 to 10 in FIG. 10, and output 4-bit parallel data (such as d03-06 and d07-10) (SerDes Output). The SerDes circuit 62 holds converted parallel data until serial/parallel conversion has been completed for a full 4-bit unit. The SerDes circuit 62 similarly converts subsequent serial data into successive units of parallel data, and successively outputs the converted 4-bit parallel data (d07-10, d11-14, d15-18, d19-22, d23-26, d27-30, d31-34, d35-38, d39-42) over the periods T300 to T309. Converted 4-bit parallel data is similarly output from the SerDes circuit 62 in the periods following T310, but is omitted from FIG. 10.

The SerDes circuit 62 recovers the clock from the received serial data, and generates a divided clock that matches the serial/parallel conversion timings. In the embodiment illustrated in FIG. 10, serial/parallel conversion is conducted in 4-bit units, and thus the clock cycle ratio of the divided clock may be set to 1/4. The period of this 1/4 clock matches the length of the respective periods T300 to T312 in FIG. 10.

The incoming data register 63-1 latches the parallel data output from the SerDes circuit 62 at times synchronized with the 1/4 clock, and during period T301, outputs d03-06 to the Data[3:0] output. The data output from the incoming data register 63-1 is subsequently shifted to the incoming data registers 63-2 to 63-4 in order over the periods T302 to T304. After d03-06, the data d07-10 and other subsequent 4-bit parallel data that was converted by the SerDes circuit 62 is similarly shifted in sequence among the incoming data registers 63-1 to 63-4.

Each of the special code detector circuits 64-1 to 64-4 make comparisons to determine whether or not one of the 10-bit sequences respectively input during each of the periods from T300 to T312 match the special code indicating a boundary position in the incoming data. In the timing chart illustrated in FIG. 10, the 10-bit special code appears in Data[12:3] output from the incoming data registers 63-1 to 63-4 during the period T305. This data sequence is enclosed by a broken ellipse in FIG. 10. During the period T305, since the special code exists in Data[12:3], the special code detector circuit (D) detects this special code, and asserts a detect signal detect[D].

Based on information regarding the detected position indicated by the detect signal detect[D] that was asserted by the special code detector circuit (D) 64-4 during the period T305, the detected position hold circuit 64-11 generates a select signal for the selector 64-21. At this point, the detected position hold circuit 64-11 also derives the suitable time for when the next and subsequent data sequences delimited by the 10-bit data boundaries will first appear in the incoming data register 63-1, so as to reduce the processing latency in the receiver 60 during T306 and subsequent periods. This timing derivation will be described later using FIGS. 11 to 14. The content of the select signal is determined so as to select the data in 4-bit units (Data[3:0], Data[4:1], etc.) that is based on the detected data boundaries and output from the incoming data register 63-1 during the suitable timing period. The determined select signal is held by the detected position hold circuit 64-11 during the transmission period in T306 and thereafter.

During T305 and subsequent periods, the selector 64-21 selects either Data[3:0] or Data[4:1] from the incoming data register 63 according to the content of the select signal output by the detected position hold circuit 64-11, and outputs the selected data as Data__10B_Alignment[3:0].

The write timing adjuster circuit 64-12 asserts a Write_valid signal during T308 and subsequent periods during which the first four bits of the boundary-delimited incoming data appears in the selector 64-21. The write controller circuit 66-2 receives the Write_valid signal output from the write timing adjuster circuit 64-12, and in T309 and subsequent periods, generates signals such as a Write_Enable signal (not illustrated) that allows the writing of data to the clock transfer buffer.

FIGS. 11 to 14 will now be used to describe how the select signal and the Write_valid signal are determined in the detected position hold circuit 64-11 and the write timing adjuster circuit 64-12.

Figure 11:
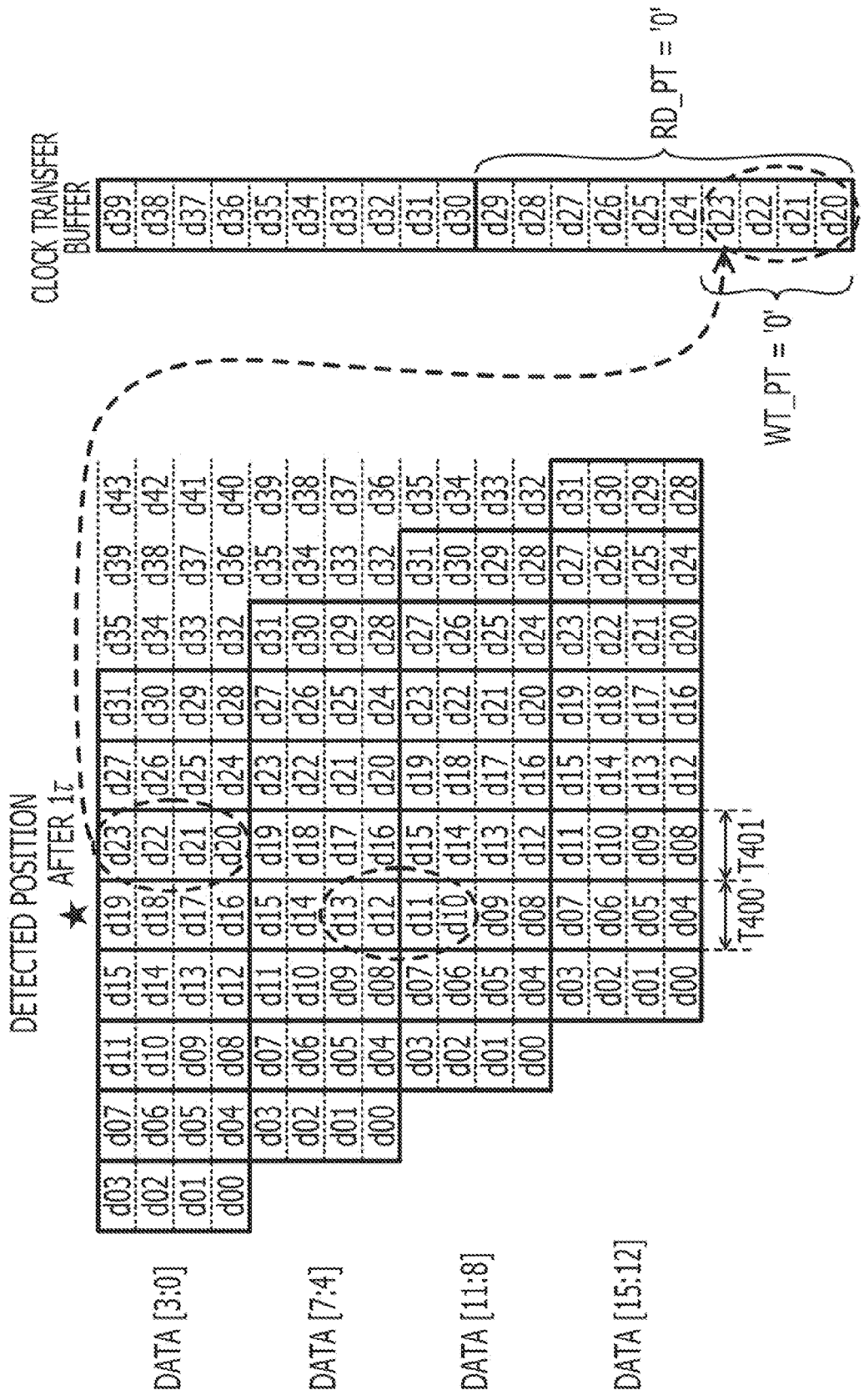
FIG. 11 illustrates select and write timings (A) for data written to a clock transfer buffer in accordance with an embodiment.

FIG. 11 illustrates select and write timings for data written to a clock transfer buffer in the case where a special code is detected by a special code detector circuit (A). FIG. 11 illustrates how respective data sequences (Data[3:0], Data[7:4], Data[11:8], and Data[15:12]) stored in the incoming data registers 63-1 to 63-4 are updated over time while shifting from the left side to the right side of the drawing. In FIG. 11, the special code d10-19 positioned at Data[9:0] is detected by the special code detector circuit (A) 64-1 during the period T400.

At this point, if an attempt is made to use the 10-bit boundary data Data[9:6] at the time T400 when the special code is detected, there is a problem in that the data will be utilized via the incoming data registers 63-1 and 63-2, and the processing latency in the receiver 60 will be large. However, FIG. 11 demonstrates that the data d20-23, which includes the data d20 at the boundary position of the next 10-bit data sequence, will arrive at the output Data[3:0] of the incoming data register 63-1 in the next cycle period T401. For this reason, by waiting one cycle after the detection of the special code and initiating conversion by the clock transfer buffer 66-1 starting from the incoming data d20-23 during the period T401, the time spent passing through the data registers 63-1 and 63-2 can be skipped, and the processing latency in the receiver 60 can be reduced.

During the period T401, the data d20-23 positioned at Data[3:0] is selected by the selector 64-21, and written to the clock transfer buffer 66-1 via the 4-bit data register 65. When the data d20-23 is written to the clock transfer buffer 66-1, a write pointer (WT_PT) indicated by the Write_Address signal is written to a position indicating "0". After the subsequent 4-bit data d24-27 and d28-31 have been written, the 10-bit unit of incoming data d20-29 is read at the read port of the clock transfer buffer 66-1 as a read pointer (RD_PT) with a value of "0".

Figure 12:
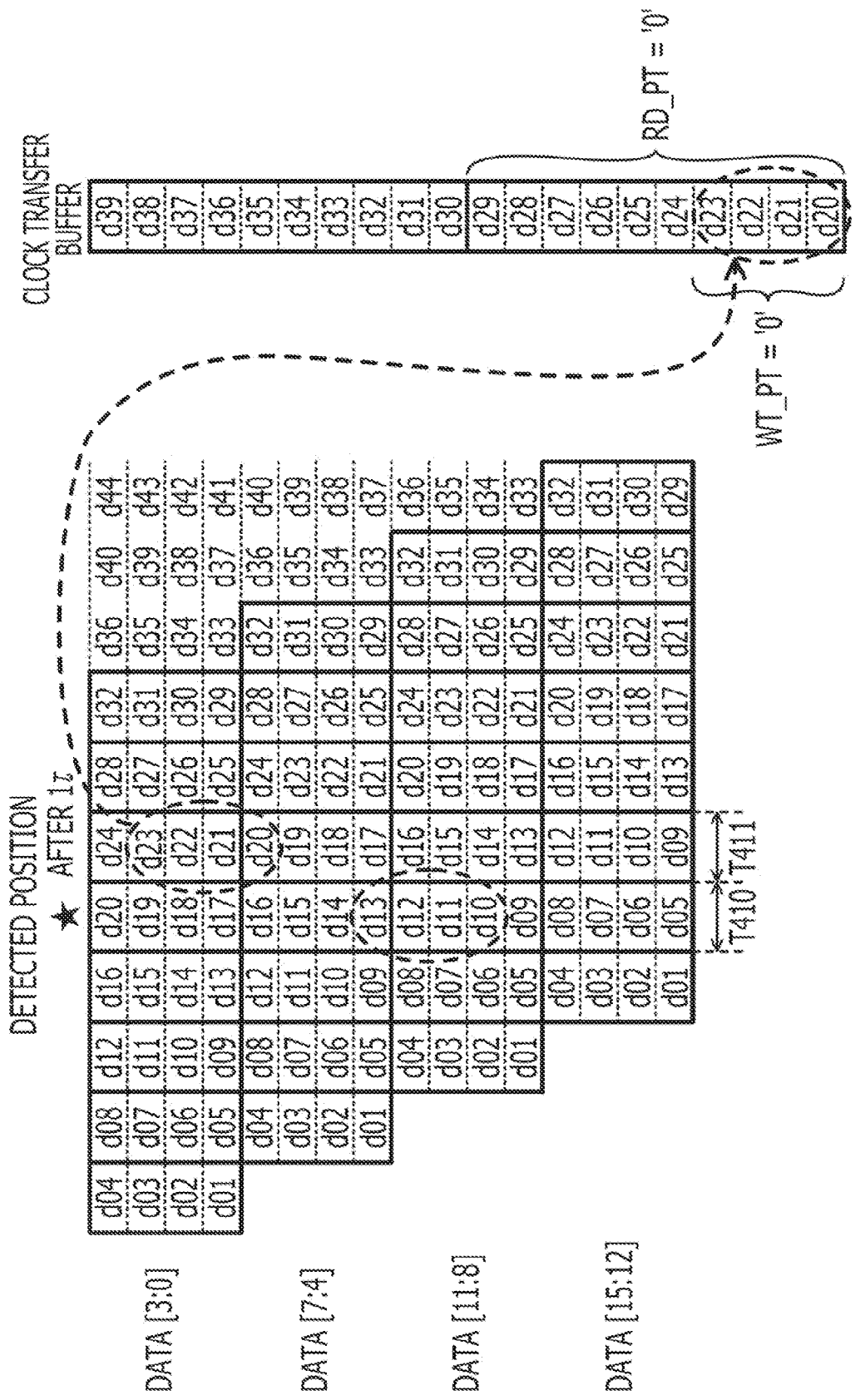
FIG. 12 illustrates select and write timings (B) for data written to a clock transfer buffer in accordance with an embodiment.

FIG. 12 illustrates select and write times for data written to a clock transfer buffer in the case where a special code is detected by a special code detector circuit (B). In FIG. 12, the special code d10-19 positioned at Data[10:1] is detected by the special code detector circuit (B) 64-2 during the period T410. In this case, the data d20-23, which includes the data d20 at the boundary position of the next 10-bit data sequence, will arrive at Data[4:1] in the next cycle period T411. For this reason, the data d20-23 positioned at Data[4:1] and subsequent data may be converted by the clock transfer buffer 66-1.

Figure 13:
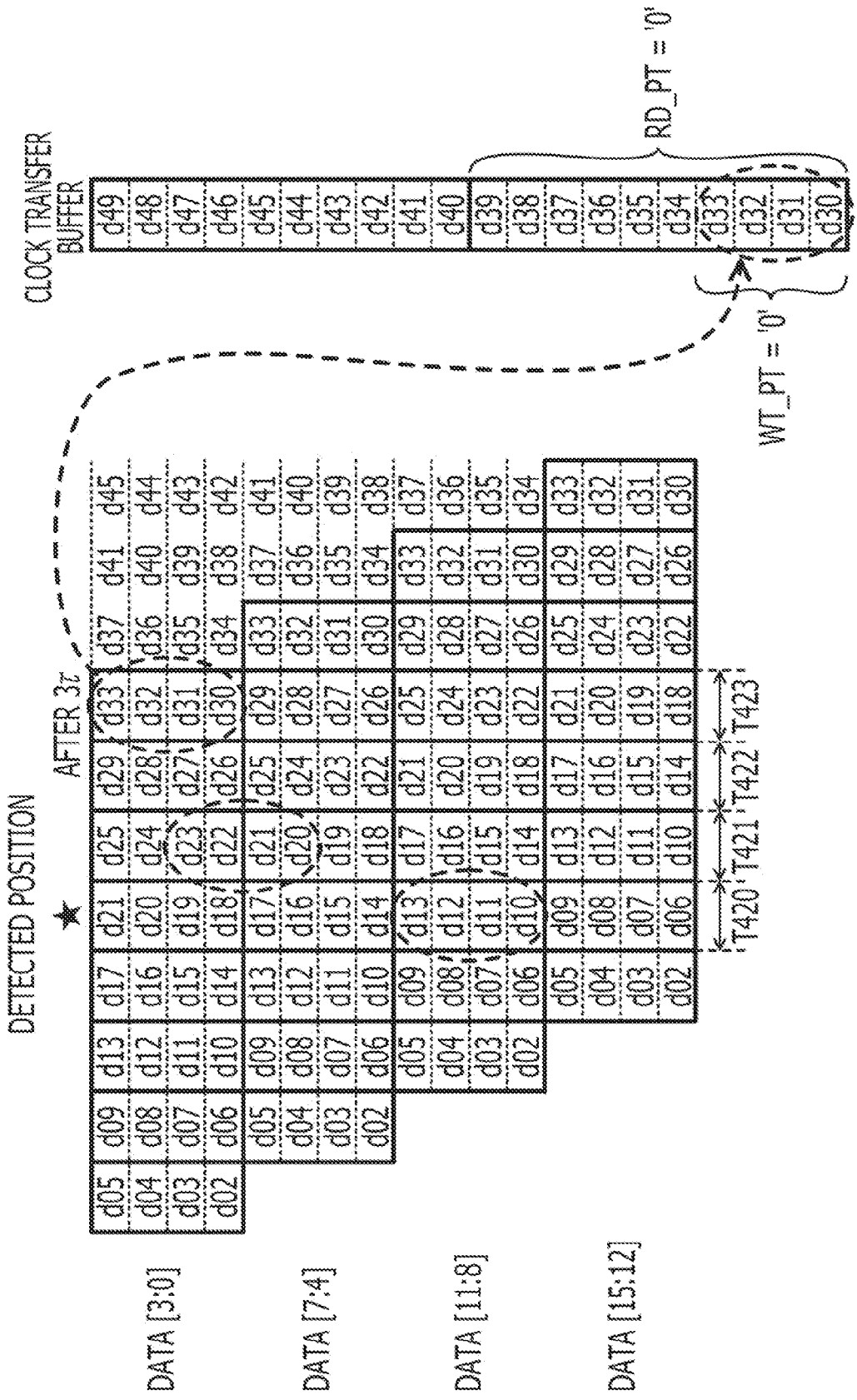
FIG. 13 illustrates select and write timings (C) for data written to a clock transfer buffer in accordance with an embodiment.

FIG. 13 illustrates select and write times for data written to a clock transfer buffer in the case where a special code is detected by a special code detector circuit (C). In FIG. 13, the special code d10-19 positioned at Data[11:2] is detected by the special code detector circuit (C) 64-3 during the period T420. In this case, the data d20-23, which includes the data d20 at the boundary position of the next 10-bit data sequence, will arrive at Data[5:2] in the next cycle period T421. However, FIG. 13 demonstrates that by waiting for another two cycles, the data d30-33, which includes the data d30 at the boundary position of the 10-bit data sequence d30-39, will arrive at Data[3:0] in the period T423. For this reason, by initiating conversion of incoming data by the clock transfer buffer 66-1 starting from the period T423, Data[3:0] can be used, which reduces the processing latency in the receiver 60.

Figure 14:
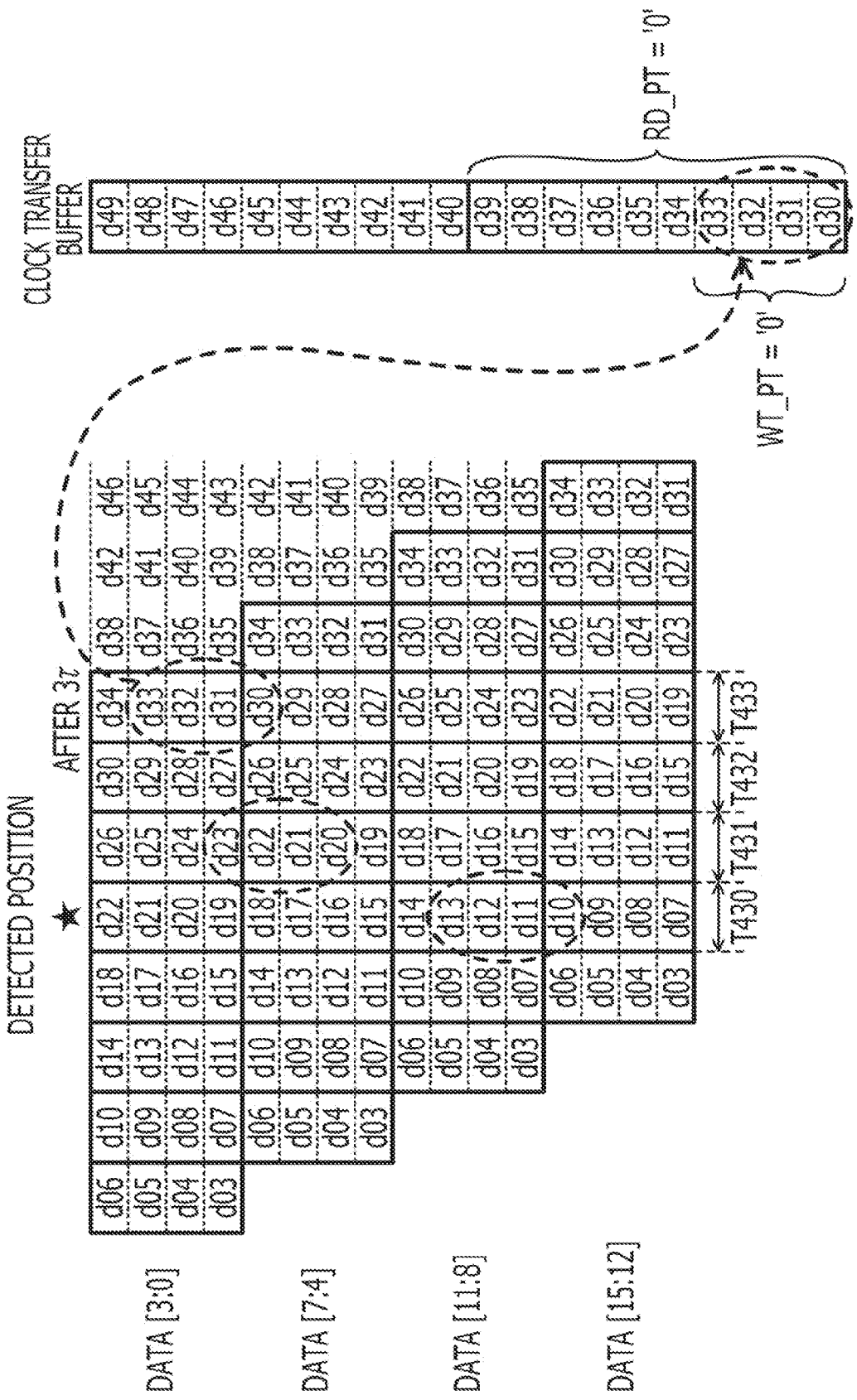
FIG. 14 illustrates select and write timings (D) for data written to a clock transfer buffer in accordance with an embodiment.

In this case, the data d20-29 is not converted by the clock transfer buffer 66-1, but since it is typical for the special code to be detected during the training period as described earlier, the failure to convert data unrelated to data transmission control does not pose a problem (this also applies to FIG. 14).

FIG. 14 illustrates select and write times for data written to a clock transfer buffer in the case where a special code is detected by a special code detector circuit (D). In FIG. 14, the special code d10-19 positioned at Data[12:3] is detected by the special code detector circuit (D) 64-4 during the period T430. In this case, the data d20-23 at the boundary position of the next 10-bit data sequence will arrive at Data[6:3] in the next cycle period T431. However, FIG. 14 demonstrates that by waiting for another two cycles, the data d30-33 at the boundary position of the 10-bit data sequence d30-39 will arrive at Data[4:1] in the period T433. For this reason, conversion by the clock transfer buffer 66-1 using Data[4:1] of the incoming data can be initiated starting from the period T433.

As described with reference to FIGS. 11 to 14, by simply having the selector 64-21 select either Data[3:0] or Data[4:1] at or after a given time following detection of the special code, the processing latency for the incoming data can be reduced, and relevant incoming data can be retrieved with simpler circuits and fewer circuit delays.

Figure 15:
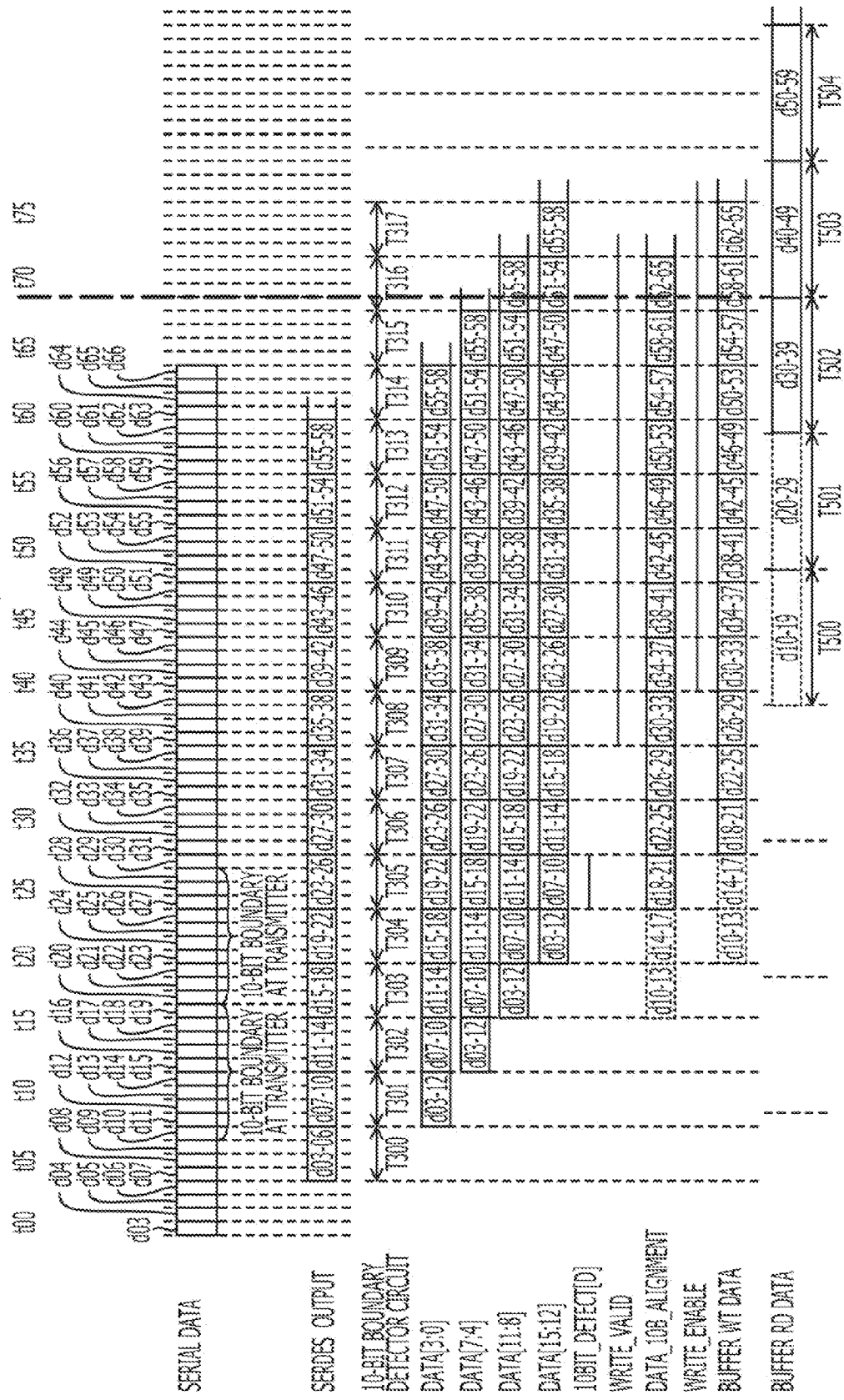
FIG. 15 illustrates a timing chart for a serial data receiver circuit in accordance with an embodiment.

FIG. 15 illustrates an operational timing chart for a serial data receiving process in a receiver 60 of an embodiment, including operations at the read port of the clock transfer buffer 66-1. In FIG. 15, operation up until Data__10B_Alignment is selected by the selector 64-21 is similar to that illustrated in FIG. 10, and thus description thereof is herein omitted. Also, in FIG. 15, the receiver clock is taken to be a clock having a cycle period equivalent to dividing the cycle period of the serial transmission clock by 10. The cycle period of the receiver clock is also taken to be equal in each of the periods from T500 to T504. Hereinafter, operation of the receiver 60 will be described while comparing the respective circuits in FIGS. 8 and 9 against FIG. 15.

The 4-bit data selected by the selector 64-21 (i.e., Data__10B_Alignment) is latched by the 4-bit data register 65, and input into the clock transfer buffer 66-1 as write data (Buffer WT Data). At this point, a Write_Enable signal that allows writing to the clock transfer buffer 66-1 is asserted by the write controller circuit 66-2 to match the period T309 during which the data d30-33 at the boundary of a 10-bit data sequence is input into the clock transfer buffer 66-1. This Write_Enable signal is generated based on a Write_valid signal generated by the write timing adjuster circuit 64-12, and is asserted during T309 and the subsequent periods during which the data d30-33 at the boundary of a 10-bit data sequence and subsequent data are input into the clock transfer buffer 66-1.

Since the Write_Enable signal for the clock transfer buffer 66-1 is asserted with respect to the Buffer WT Data d30-33 and subsequent data in the period T309 and thereafter, d30-33 and subsequent data is written to the clock transfer buffer 66-1, whereas data such as d10-19 and d20-29 are not written. For this reason, d30-39 and subsequent 10-bit data sequences are read from the read port of the clock transfer buffer 66-1 during the period T502 and thereafter. In so doing, the 10-bit data sequences thus read are passed to the incoming data register 67, the 10B8B converter circuit 68, and the incoming data register 69, and converted into the final 8-bit incoming data.

According to the configuration described above, incoming data delimited by specified data boundaries is retrieved from serial/parallel conversion in the SerDes circuit 62 of the receiver 60, and clock transfer is conducted in the clock transfer buffer 66-1. Furthermore, these processes are conducted at high speed and with low processing latency. For this reason, the performance of systems having high-speed serial buses can be improved. Compare, for example, the processing latency in the high-speed serial bus receiver illustrated in FIG. 6 versus the embodiment illustrated in FIG. 15. In both FIGS. 6 and 15, the data d30 is input during cycle t27 of the serial transmission clock. But whereas the time when this data d30 is read from the read port of the clock transfer buffer is t80 in the high-speed serial bus receiver illustrated in FIG. 6, the time is t68 in the embodiment illustrated in FIG. 15. The above thus demonstrates that the processing latency has been reduced by 22 cycles in the present embodiment.

However, embodiments in accordance with the disclosed technology are not limited to the embodiment described above, and that various modifications may be made without departing from the spirit and scope of the disclosed technology. For example, in the embodiment described above, it is not needed for the data boundaries of the transmission data to be set in 10-bit units, and other bit lengths may be used. Also, the SerDes circuit 62 in the receiver 60 is not limited to conducting serial/parallel conversion in units of four bits, and may be configured to conduct serial/parallel conversion in units of other bit lengths in accordance with the operational frequency of the receiver and the number of bits between data boundaries.

In such cases, the bit length delimited by the incoming data boundaries is preferably set larger than the bit length used to handle parallel data in the SerDes circuit, with the bit length used to handle parallel data preferably being a power of two. Doing so makes it possible to easily generate a divided clock based on the recovery clock and conduct serial/parallel conversion in the SerDes circuit of the receiver. Additionally, although the bit length used to handle parallel data will also depend on the available operational frequencies in the receiver, the bit length is preferably as small as possible. A smaller bit length allows for a smaller offset between the parallel data converted by the SerDes circuit 62, and the boundary positions in the incoming data. Furthermore, it is preferable to determine the bit length used to handle parallel data such that the least common multiple with the bit length delimiting the boundary positions in the incoming data becomes as small as possible. In so doing, the number of rows in the clock transfer buffer can be decreased, and control of reading and writing with respect to the clock transfer buffer becomes easier.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A serial data receiver circuit apparatus configured to receive serial data including communication data delimited by a first bit length, and control data delimited by the first bit length, the circuit apparatus comprising:
   a serial/parallel converter to receive the serial data, and convert the serial data into parallel data of a second bit length that is smaller than the first bit length;
   a plurality of registers whose bit widths are substantially equal to the second bit length, the plurality of registers to hold a plurality of parallel data converted by the serial/parallel converter in the order that the data was input;
   a detector to detect control data included in the data stored in the plurality of registers, and detect a delimiter position in the received serial data, the control data indicating whether the data is to be written to a clock transfer buffer;
   a detected position hold circuit to generate, based on information regarding the data delimiter position obtained from detection results of the detector, a select signal to select data included in the parallel data stored in the plurality of registers, the data is selected in units of the second bit length starting from the data delimiter position; and
   a selector to select, based on the select signal generated by the detected position hold circuit, data in units of the second bit length from among the data stored in the plurality of registers, the data is selected based on the detected delimiter position.

2. The serial data receiver circuit apparatus according to claim 1, wherein
the detector includes a plurality of comparators whose number is substantially equal to the second bit length, that compares a bit pattern of the parallel data of the second bit length input into the detector and a specific bit pattern of control data, each of the plurality of comparators receives the incoming data stored in the plurality of registers in units of the first bit length, and offset from each other by one bit each, and
each comparator circuit detects a delimiter position in the incoming data by determining whether or not the input data of the first bit length matches the specific bit pattern.

3. The serial data receiver circuit apparatus according to claim 1, wherein
the plurality of registers includes a first register to store data from the serial/parallel converter, and a second register to store data stored in the first register, among the plurality of registers, and
the detected position hold circuit determines a time enabling the selector to select data received after the control data for which the specific bit pattern was detected in units of the second bit length from the data stored in the first and second registers based on information regarding the data delimiter position obtained from the detection results of the detector, and generates a select signal to select data in units of the second bit length starting from the data delimiter position at the determined time by the selector.

4. The serial data receiver circuit apparatus according to claim 1, further comprising:
a clock transfer buffer, into which the data of the second bit length that was selected by the selector is written in synchronization with a first clock synchronized to the transmission clock of the serial data, and from which the written data is read in units of the first bit length in synchronization with a second clock by which the internal circuits in the serial data receiver circuit apparatus operate;
a write controller circuit to generate a first control signal synchronized with the first clock to write the selected data of the second bit length to the clock transfer buffer, and to control the writing of the selected data of the second bit length to the clock transfer buffer by using the first control signal;
a synchronizer to generate a second control signal by synchronizing the first control signal generated by the write controller with the second clock; and
a read controller to use the second control signal that was synchronized with the second clock by the synchronizer to generate a third control signal for reading data written to the clock transfer buffer in units of the first bit length and in synchronization with the second clock.

5. The serial data receiver circuit apparatus according to claim 4, further comprising:
a write timing controller to determine, based on information regarding the data delimiter position obtained from the detection results of the detector, a time enabling the selector to select data received after the control data that includes the specific bit pattern is detected in units of the second bit length, and generate a write timing control signal to initiate the writing of the data to the clock transfer buffer starting from the data delimiter position based on information regarding the determined time, wherein the selected data is incoming data;
wherein the write controller generates the first control signal by using the write timing control signal generated by the write timing controller.

6. A method of receiving serial data including communication data delimited by a first bit length, and control data delimited by the first bit length, the method comprising:
converting received serial data into parallel data in units of a second bit length that is equal to or smaller than the first bit length;
holding a plurality of the converted parallel data in a plurality of registers whose bit widths are substantially equal to the second bit length in the order that the data was input;
detecting control data included in the parallel data in the plurality of registers and a delimiter position in the received serial data by detecting a specific bit pattern that is unique to a bit pattern of the control data, the control data indicating whether the data is to be written to a clock transfer buffer;
generating a select signal to select data included in the parallel data stored in the plurality of registers based on information regarding the detected data delimiter position, the data is selected in units of the second bit length starting from the data delimiter position;
selecting data in units of the second bit length among the data stored in the plurality of registers based on the detected delimiter position using the generated select signal;
writing the selected data of the second bit length to a clock transfer buffer to transfer data from a first clock synchronized with the transmission clock of the serial data to a second clock synchronized with a clock by which the internal circuits of the receiver circuit apparatus operate; and
reading the data written to the clock transfer buffer in units of the first bit length and in synchronization with the second clock.

7. The method of receiving serial data according to claim 6, further comprising:
in the case where the delimiter position in the incoming data is detected by detecting the specific bit pattern,
determining a time enabling to select data received after the control data having the specific data pattern was detected in units of the second bit length based on the detected data delimiter position, and
writing the data to the clock transfer buffer starting from the data delimiter position based on information regarding the determined time.

8. A serial data receiver circuit apparatus to receive serial data including communication data delimited by a first bit length, and control data delimited by the first bit length, the circuit apparatus comprising:
a serial/parallel converter to receive the serial data, and convert the serial data into parallel data in units of a second bit length that is substantially equal to or smaller than the first bit length;
a plurality of registers whose bit widths are substantially equal to the second bit length, the plurality of registers to hold a plurality of parallel data converted by the serial/parallel converter in the order that the data was input;
a detector to detect control data included in the data stored in the plurality of registers, and detect a delimiter position in the received serial data, the control data indicating whether the data is to be written to a clock transfer buffer;

a detected position hold circuit to generate, based on information regarding the data delimiter position obtained from the detection results of the detector, a select signal to select data included in the parallel data stored in the plurality of registers, the data is selected in units of the second bit length starting from the data delimiter position; and a selector to select, based on the select signal generated by the detected position hold circuit, data in units of the second bit length from among the data stored in the plurality of registers, the data is selected based on the detected delimiter position.

* * * * *